United States Patent
Wang et al.

(10) Patent No.: US 12,175,681 B2
(45) Date of Patent: Dec. 24, 2024

(54) IMAGE PROCESSING METHOD AND ELECTRONIC DEVICE TO IMPROVE AN IMAGE COMPOSITING EFFECT

(71) Applicant: Huawei Technologies Co., Ltd., Shenzhen (CN)

(72) Inventors: Liqiang Wang, Shenzhen (CN); Henghui Lu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 17/636,542

(22) PCT Filed: Jul. 30, 2020

(86) PCT No.: PCT/CN2020/105710
§ 371 (c)(1),
(2) Date: Feb. 18, 2022

(87) PCT Pub. No.: WO2021/031819
PCT Pub. Date: Feb. 25, 2021

(65) Prior Publication Data
US 2022/0301180 A1    Sep. 22, 2022

(30) Foreign Application Priority Data
Aug. 22, 2019  (CN) .......................... 201910779341.6

(51) Int. Cl.
*G06T 7/194* (2017.01)
*G06T 3/4038* (2024.01)
*G06T 5/50* (2006.01)

(52) U.S. Cl.
CPC ............ *G06T 7/194* (2017.01); *G06T 3/4038* (2013.01); *G06T 5/50* (2013.01)

(58) Field of Classification Search
None
See application file for complete search history.

(56) References Cited

U.S. PATENT DOCUMENTS

| | | | |
|---|---|---|---|
| 8,300,890 B1 | 10/2012 | Gaikwad et al. | |
| 2007/0003154 A1* | 1/2007 | Sun | G06V 40/103 382/254 |

(Continued)

FOREIGN PATENT DOCUMENTS

| | | |
|---|---|---|
| CN | 101324963 A | 12/2008 |
| CN | 103544685 A | 1/2014 |

(Continued)

OTHER PUBLICATIONS

R. Shah and P. J. Narayanan, "Interactive Video Manipulation Using Object Trajectories and Scene Backgrounds," in IEEE Transactions on Circuits and Systems for Video Technology, vol. 23, No. 9, pp. 1565-1576, Sep. 2013, doi: 10.1109/TCSVT.2013.2248972. (Year: 2013).*

(Continued)

*Primary Examiner* — Amandeep Saini
*Assistant Examiner* — Caroline Tabancay Duffy
(74) *Attorney, Agent, or Firm* — Conley Rose, P.C.

(57) ABSTRACT

An image processing method includes displaying a first key frame image obtained from a sequence frame video stream; obtaining a first foreground image and a first background image obtained after foreground and background separation processing is performed on the first key frame image; obtaining a second foreground image obtained after foreground image processing is performed on a first target object in the first foreground image; obtaining a third background image obtained after background repair processing is performed on the first background image using a second background image, where the second background image is a background image included in a second key frame image obtained by photographing a target scene before the first key frame image is obtained; and obtaining a first key frame image obtained after foreground and background compos- (Continued)

iting processing is performed on the second foreground image and the third background image.

20 Claims, 14 Drawing Sheets

(56) References Cited

U.S. PATENT DOCUMENTS

| | | | |
|---|---|---|---|
| 2011/0044341 A1 | 2/2011 | Sundstrom et al. | |
| 2013/0063736 A1* | 3/2013 | Chiba | G06F 40/103 |
| | | | 358/1.6 |
| 2013/0182184 A1* | 7/2013 | Senlet | H04N 5/272 |
| | | | 348/586 |
| 2015/0172627 A1 | 6/2015 | Lee et al. | |
| 2016/0110848 A1 | 4/2016 | Gray et al. | |
| 2021/0281669 A1* | 9/2021 | Cui | G06F 3/04845 |

FOREIGN PATENT DOCUMENTS

| | | | |
|---|---|---|---|
| CN | 104636377 A | 5/2015 | |
| CN | 104735435 A | 6/2015 | |
| CN | 105488777 A | 4/2016 | |
| CN | 105513030 A | 4/2016 | |
| CN | 105704028 A | 6/2016 | |
| CN | 106331460 A | 1/2017 | |
| CN | 107343149 A * | 11/2017 | ......... H04N 5/23229 |
| CN | 107888197 A | 4/2018 | |
| CN | 108460038 A | 8/2018 | |
| CN | 108665510 A | 10/2018 | |
| CN | 108848325 A | 11/2018 | |
| CN | 109325009 A | 2/2019 | |
| CN | 109361850 A | 2/2019 | |
| CN | 109831409 A | 5/2019 | |
| CN | 110675420 A | 1/2020 | |

OTHER PUBLICATIONS

Shah Rajvi et al "Interactive Video Manipulation Using Object Trajectories and Scene Backgrounds," IEEE Transactions On Circuits and Systems for Video Technology, IEEE, USA, vol. 23, No. 9, XP011525592, Sep. 2013, pp. 1565-1576.

Fernanda Brandi, et al., "Super-resolution of video using key frames and motion estimation," 2008, XP055116678, 4 pages.

* cited by examiner

Key frame image     Foreground image     Background image

Background image of an (n−1)$^{th}$ frame

Background image of an $n^{th}$ frame

Background object

Background image of an $(n+1)^{th}$ frame

Repaired background image of an (n+1)<sup>th</sup> frame

IMAGE PROCESSING METHOD AND ELECTRONIC DEVICE TO IMPROVE AN IMAGE COMPOSITING EFFECT

CROSS-REFERENCE TO RELATED APPLICATIONS

This is a U.S. National Stage of International Patent Application No. PCT/CN2020/105710 filed on Jul. 30, 2020, which claims priority to Chinese Patent Application No. 201910779341.6 filed on Aug. 22, 2019, both of which are hereby incorporated by reference in their entireties.

TECHNICAL FIELD

This application relates to the field of image processing technologies, and in particular, to an image processing method and an electronic device.

BACKGROUND

People can photograph and process a target region (for example, a face) in real time by using a camera of a mobile terminal device such as a mobile phone, a tablet computer, or a notebook computer, to achieve a real-time processing effect of the target region. These functions effectively help a user generate an image with a relatively satisfactory effect.

However, in application of the functions, the target region (for example, the face) may be a foreground region in an entire image, the foreground region occupies a relatively large proportion of an area of the image, and the foreground region is usually deformed after being processed. If a deformed foreground region is directly stitched back to the original image, the foreground region does not match a background image region (that is, a region other than the target region in the original image) during stitching. Therefore, when the foreground region is processed and deformed, the background image region urgently needs to be processed, to resolve a mismatch between the foreground and the background.

Currently, there is a background fusion technology that is based on image affine transformation, that is, stretching deformation is performed on a background image region by using a correspondence between a foreground existing before deformation and a foreground obtained after the deformation, so that a background image region obtained after the stretching deformation exactly matches an edge region of the foreground obtained after the deformation, thereby eliminating a mismatch between the foreground and the background during stitching. For example, stretching deformation is performed on a background image region during face thinning in facial beautification, to resolve a mismatch between a foreground and a background during stitching. However, in this technology, after stretching deformation is performed on the background image region, a processing trace is obvious, and a real feeling of an entire image is damaged. Consequently, an image compositing effect is poor after foreground image processing.

SUMMARY

Embodiments of this application provide an image processing method and an electronic device, to improve an image compositing effect obtained after foreground image processing.

To resolve the foregoing technical problem, the embodiments of this application provide the following technical solutions.

According to a first aspect, an embodiment of this application provides an image processing method, applied to an electronic device having a camera. The method includes: displaying a first key frame image obtained from a sequence frame video stream, where the sequence frame video stream is obtained by photographing, by using the camera, a target scene including a first target object; obtaining a first foreground image and a first background image that are obtained after foreground and background separation processing is performed on the first key frame image, where the first foreground image includes the first target object; obtaining a second foreground image obtained after foreground image processing is performed on the first target object in the first foreground image, where the second foreground image includes a first target object obtained after the foreground image processing; obtaining a third background image obtained after background repair processing is performed on the first background image by using a second background image, where the second background image is a background image included in a second key frame image, and the second key frame image is obtained by photographing, by using the camera, the target scene before the first key frame image is obtained; and obtaining a first key frame image obtained after foreground and background compositing processing is performed on the second foreground image and the third background image. In this solution, the second background image may be obtained before the first key frame image is obtained. and background repair processing may be performed on the first background image by using the second background image. Therefore, the obtained third background image can include as comprehensive background image information as possible, to patch a blank untextured region caused during generation of the second foreground image, thereby improving an image compositing effect obtained after the foreground image processing.

In a possible implementation, before the displaying a first key frame image obtained from a sequence frame video stream, the method further includes: displaying the second key frame image obtained from a preview video stream, where the preview video stream is obtained by performing preview photographing on the target scene before the camera generates the sequence frame video stream; and obtaining the second background image separated from the second key frame image. In this solution, before the camera generates the sequence frame video stream, preview photographing is performed on the target scene to obtain the preview video stream, and the second key frame image is obtained from the preview video stream. In this case, because the camera photographs only the target scene, a background image is separated from the second key frame image, and the separated background image is used as the second background image.

In a possible implementation, before the obtaining a third background image obtained after background repair processing is performed on the first background image by using a second background image, the method further includes: displaying the second key frame image obtained from the sequence frame video stream; obtaining a fourth background image obtained after foreground and background separation processing is performed on the second key frame image; and obtaining the second background image obtained by performing background repair processing on the fourth background image by using a fifth background image, where the fifth background image is separated from a third key frame image in a preview video stream, and the preview video stream is obtained by performing preview photographing on the target scene before the camera generates the sequence frame video stream. In this solution, before the camera generates the sequence frame video stream, preview photographing is performed on the target scene to obtain the preview video stream, and the third key frame image is obtained from the preview video stream In this case, because the camera photographs only the target scene, a background image is separated from the third key frame image, the separated background image is used as the fifth background image, and the fifth background image may be used to perform background image repair processing on the fourth background image.

In a possible implementation, before the displaying a first key frame image obtained from a sequence frame video stream, the method further includes: before the camera generates the sequence frame video stream, consecutively photographing the target scene by using the camera, to obtain a plurality of consecutive background images; and obtaining the second background image obtained after cumulative superimposition processing is performed on the plurality of consecutive background images. In this solution, in a scenario in which the camera is fixed and a photographing environment is unchanged, the target scene is consecutively photographed by using the camera, and cumulative superimposition may be performed on the plurality of consecutive background images to obtain a more comprehensive background image. The more comprehensive background image may be used as the second background image, and the second background image may be used to perform background image repair processing on the first background image.

In a possible implementation, the displaying a first key frame image obtained from a sequence frame video stream includes: displaying n sequence frame images obtained from the sequence frame video stream, where n is a positive integer greater than or equal to 2; obtaining one original key frame image and n−1 related frame images that are determined from the n sequence frame images; and performing definition enhancement processing on the original key frame image by using pixel information of the n−1 related frame images, and determining, as the first key frame image, an original key frame image obtained after the definition enhancement processing. In this solution, definition enhancement may be performed on the key frame image. The original key frame image and the n−1 related frame images are determined from the n sequence frame images, the original key frame image is used as a main image, and the related frame images are n−1 frame images other than a frame image currently used as the original key frame image in the n frame images. The pixel information of the n−1 related frame images is obtained. The pixel information of the related frame image may be an energy value of each pixel of the related frame image. Definition enhancement processing is performed on the original key frame image based on the pixel information of the n−1 related frame images, and the original key frame image obtained after the definition enhancement processing is used as the first key frame image. A first key frame image with higher definition is used, so that an image compositing effect can be further improved.

In a possible implementation, the performing definition enhancement processing on the original key frame image by using pixel information of the n−1 related frame images includes: obtaining an original image point energy value of the original key frame image; obtaining k front related frame images and k rear related frame images of the original key frame image from the n−1 related frame images, where a value of k is less than or equal to (n−1)÷2; and obtaining an optimized image point energy value that is of the original key frame image and that is obtained by performing optimization processing on the original image point energy value of the original key frame image by using image point energy values of the k front related frame images and the k rear related frame images of the original key frame image. In this solution, definition enhancement may be performed on the key frame image. The original key frame image is used as the main image, to determine the k (for example, k=1, 2, or 3) front related frame images and the k rear related frame images, and optimization processing is performed on the energy value of the original key frame image in an energy manner, to enhance resolution of the original key frame image.

In a possible implementation, after the obtaining a first key frame image obtained after foreground and background compositing processing is performed on the second foreground image and the third background image, the method further includes: obtaining a first key frame image obtained after foreground edge fusion processing is performed on the first key frame image obtained after the foreground and background compositing processing; and outputting the first key frame image obtained after the foreground edge fusion processing. In this solution, a foreground image edge region is processed to reduce unnatural image transition caused by a sudden edge change. For example, the edge processing may be implemented through feathering processing. Frame interpolation processing is performed on a video based on a key frame video stream, to implement smooth output of a processed image video.

In a possible implementation, the obtaining a third background image obtained after background repair processing is performed on the first background image by using a second background image includes: obtaining a changed inter-frame location relationship between the first background image and the second background image based on a feature point correspondence between the first background image and the second background image; obtaining a transformed second background image obtained after perspective transformation is performed on the second background image based on the changed inter-frame location relationship; and stitching the transformed second background image to the first background image to obtain the third background image. In this solution, the feature point correspondence between the first background image and the second background image is a correspondence between same feature points in the two background images. The changed inter-frame location relationship between the first background image and the second background image may be obtained based on the feature point correspondence. The changed inter-frame location relationship may be an inter-frame location relationship obtained when the second background image changes to the first background image. For example, the changed inter-frame location relationship may be a changed posture relationship between the second background image and the first background image. Next, perspective transformation is performed on the second background image based on the changed inter-frame location relationship, to obtain the transformed second background image. Finally, the transformed second background image is stitched to the first background image, so that a blank untextured region in the current-frame background image can be patched. After the second background image obtained after the perspective transformation is stitched to the first background image, the third background image can be output. The third background image may be used for the foreground and background image compositing. Because the blank untextured region has been patched in the third background image, an image compositing effect can be improved.

In a possible implementation, the obtaining a changed inter-frame location relationship between the first background image and the second background image based on a feature point correspondence between the first background image and the second background image includes: obtaining a current-frame posture parameter corresponding to the first background image; obtaining an initial inter-frame location relationship between the first background image and the second background image based on a previous-frame posture parameter corresponding to the second background image and the current-frame posture parameter; obtaining the feature point correspondence obtained after feature extraction and feature matching are performed on the first background image and the second background image; and optimizing the initial inter-frame location relationship by using the feature point correspondence, to obtain the changed inter-frame location relationship between the first background image and the second background image. In this solution, the current-frame posture parameter corresponding to the first background image may be obtained by using an IMU of the electronic device, the previous-frame posture parameter corresponding to the second background image may be obtained by using a prestored posture parameter, and the initial inter-frame location relationship between the first background image and the second background image is calculated by using the previous-frame posture parameter and the current-frame posture parameter. Next, feature extraction and feature matching are performed on the first background image and the second background image to obtain the feature point correspondence. An extracted feature may be a DAISY feature. Finally, the initial inter-frame location relationship is optimized by using the feature point correspondence, to obtain the changed inter-frame location relationship between the first background image and the second background image.

In a possible implementation, the obtaining a transformed second background image obtained after perspective transformation is performed on the second background image based on the changed inter-frame location relationship includes: obtaining a perspective transformation matrix between the first background image and the second background image by using the changed inter-frame location relationship; and obtaining the transformed second background image obtained after perspective transformation is performed on the second background image by using the perspective transformation matrix. In this solution, the perspective transformation matrix between the current-frame image and the previous-frame image is calculated by using the changed inter-frame location relationship obtained after the optimization, perspective transformation is performed on the previous-frame background image by using the perspective transformation matrix, and the transformed image is stitched to the current-frame background image, to patch the blank untextured region in the current-frame background image. Finally, a patched background image and the current-frame posture parameter are output as a previous-frame background image and a previous-frame posture parameter, to participate in a next frame cycle, and simultaneously the patched background image is output.

In a possible implementation, the obtaining a third background image obtained after background repair processing is performed on the first background image by using a second background image includes: obtaining a background object image from the second background image through segmentation; and when the background object image enters a foreground missing region in the first background image, performing background patching processing on the first background image by using the background object image. In this solution, in a scenario in which the camera is fixed and the photographing environment is partially changed, for example, when a person is walking in a photographing background, first, person target regions are obtained from key frame backgrounds through segmentation by using an inter-frame difference method, to be saved as to-be-matched targets; and then, when it is determined, by using a target tracking algorithm, that the to-be-matched targets enter a foreground missing region of a current key frame, the to-be-matched targets are searched for a target image with relatively high contour similarity to patch the foreground missing region.

According to a second aspect, an embodiment of this application further provides an electronic device. The electronic device has a function of implementing behavior of the electronic device in the foregoing aspect and the possible implementations of the foregoing aspect. The function may be implemented by hardware, or may be implemented by hardware executing corresponding software. The hardware or the software includes one or more modules or units corresponding to the foregoing function, for example, a camera, one or more processors, a memory, a plurality of applications, and one or more computer programs. The one or more computer programs are stored in the memory, the one or more computer programs include instructions, and when the instructions are executed by the electronic device, the electronic device is enabled to perform the following steps: displaying a first key frame image obtained from a sequence frame video stream, where the sequence frame video stream is obtained by photographing, by using the camera, a target scene including a first target object; obtaining a first foreground image and a first background image that are obtained after foreground and background separation processing is performed on the first key frame image, where the first foreground image includes the first target object; obtaining a second foreground image obtained after foreground image processing is performed on the first target object in the first foreground image, where the second foreground image includes a first target object obtained after the foreground image processing; obtaining a third background image obtained after background repair processing is performed on the first background image by using a second background image, where the second background image is a background image included in a second key frame image, and the second key frame image is obtained by photographing, by using the camera, the target scene before the first key frame image is obtained; and obtaining a first key frame image obtained after foreground and background compositing processing is performed on the second foreground image and the third background image.

In a possible implementation, when the instructions are executed by the electronic device, the electronic device is enabled to specifically perform the following steps: before displaying the first key frame image obtained from the sequence frame video stream, displaying the second key frame image obtained from a preview video stream, where the preview video stream is obtained by performing preview photographing on the target scene before the camera generates the sequence frame video stream; and obtaining the second background image separated from the second key frame image.

In a possible implementation, when the instructions are executed by the electronic device, the electronic device is enabled to specifically perform the following steps: before obtaining the third background image obtained after the background repair processing is performed on the first background image by using the second background image, displaying the second key frame image obtained from the sequence frame video stream; obtaining a fourth background image obtained after foreground and background separation processing is performed on the second key frame image; and obtaining the second background image obtained by performing background repair processing on the fourth background image by using a fifth background image, where the fifth background image is separated from a third key frame image in a preview video stream, and the preview video stream is obtained by performing preview photographing on the target scene before the camera generates the sequence frame video stream.

In a possible implementation, when the instructions are executed by the electronic device, the electronic device is enabled to specifically perform the following steps: before displaying the first key frame image obtained from the sequence frame video stream, before the camera generates the sequence frame video stream, consecutively photographing the target scene by using the camera, to obtain a plurality of consecutive background images; and obtaining the second background image obtained after cumulative superimposition processing is performed on the plurality of consecutive background images.

In a possible implementation, when the instructions are executed by the electronic device, the electronic device is enabled to specifically perform the following steps: displaying n sequence frame images obtained from the sequence frame video stream, where n is a positive integer greater than or equal to 2; obtaining one original key frame image and n−1 related frame images that are determined from the n sequence frame images; and performing definition enhancement processing on the original key frame image by using pixel information of the n−1 related frame images, and determining, as the first key frame image, an original key frame image obtained after the definition enhancement processing.

In a possible implementation, when the instructions are executed by the electronic device, the electronic device is enabled to specifically perform the following steps: obtaining an original image point energy value of the original key frame image; obtaining k front related frame images and k rear related frame images of the original key frame image from the n−1 related frame images, where a value of k is less than or equal to (n−1)÷2; and obtaining an optimized image point energy value that is of the original key frame image and that is obtained by performing optimization processing on the original image point energy value of the original key frame image by using image point energy values of the k front related frame images and the k rear related frame images of the original key frame image.

In a possible implementation, when the instructions are executed by the electronic device, the electronic device is enabled to specifically perform the following steps: obtaining a first key frame image obtained after foreground edge fusion processing is performed on the first key frame image obtained after the foreground and background compositing processing; and outputting the first key frame image obtained after the foreground edge fusion processing.

In a possible implementation, when the instructions are executed by the electronic device, the electronic device is enabled to specifically perform the following steps: obtaining a changed inter-frame location relationship between the first background image and the second background image based on a feature point correspondence between the first background image and the second background image; obtaining a transformed second background image obtained after perspective transformation is performed on the second background image based on the changed inter-frame location relationship; and stitching the transformed second background image to the first background image to obtain the third background image.

In a possible implementation, when the instructions are executed by the electronic device, the electronic device is enabled to specifically perform the following steps: obtaining a current-frame posture parameter corresponding to the first background image; obtaining an initial inter-frame location relationship between the first background image and the second background image based on a previous-frame posture parameter corresponding to the second background image and the current-frame posture parameter; obtaining the feature point correspondence obtained after feature extraction and feature matching are performed on the first background image and the second background image; and optimizing the initial inter-frame location relationship by using the feature point correspondence, to obtain the changed inter-frame location relationship between the first background image and the second background image.

In a possible implementation, when the instructions are executed by the electronic device, the electronic device is enabled to specifically perform the following steps: obtaining a perspective transformation matrix between the first background image and the second background image by using the changed inter-frame location relationship; and obtaining the transformed second background image obtained after perspective transformation is performed on the second background image by using the perspective transformation matrix.

In a possible implementation, when the instructions are executed by the electronic device, the electronic device is enabled to specifically perform the following steps: obtaining a background object image from the second background image through segmentation; and when the background object image enters a foreground missing region in the first background image, performing background patching processing on the first background image by using the background object image.

In the second aspect of this application, the composition modules of the electronic device may further perform the steps described in the first aspect and the possible implementations. For details, refer to the descriptions in the first aspect and the possible implementations.

According to a third aspect, an embodiment of this application further provides an electronic device, including a camera, one or more processors, a memory, a plurality of applications, and one or more computer programs. The one or more computer programs are stored in the memory, and the one or more computer programs include instructions. When the instructions are executed by the electronic device, the electronic device is enabled to perform the image processing method in any possible implementation of any one of the foregoing aspects.

According to a fourth aspect, an embodiment of this application further provides an electronic device, including one or more processors and one or more memories. The one or more memories are coupled to the one or more processors, and the one or more memories are configured to store computer program code. The computer program code includes computer instructions. When the one or more processors execute the computer instructions, the electronic device is enabled to perform the image processing method in any possible implementation of any one of the foregoing aspects.

According to a fifth aspect, an embodiment of this application provides a computer-readable storage medium. The computer-readable storage medium stores instructions. When the instructions are run on a computer, the computer is enabled to perform the method according to the first aspect.

According to a sixth aspect, an embodiment of this application provides a computer program product including instructions. When the computer program product runs on a computer, the computer is enabled to perform the method according to the first aspect.

According to a seventh aspect, this application provides a chip system. The chip system includes a processor, configured to support an electronic device in implementing the functions in the foregoing aspect, for example, sending or processing the data and/or information in the foregoing method. In a possible design, the chip system further includes a memory. The memory is configured to store program instructions and data that are necessary for the electronic device. The chip system may include a chip, or may include a chip and another discrete component.

DESCRIPTION OF EMBODIMENTS

Figure 1:
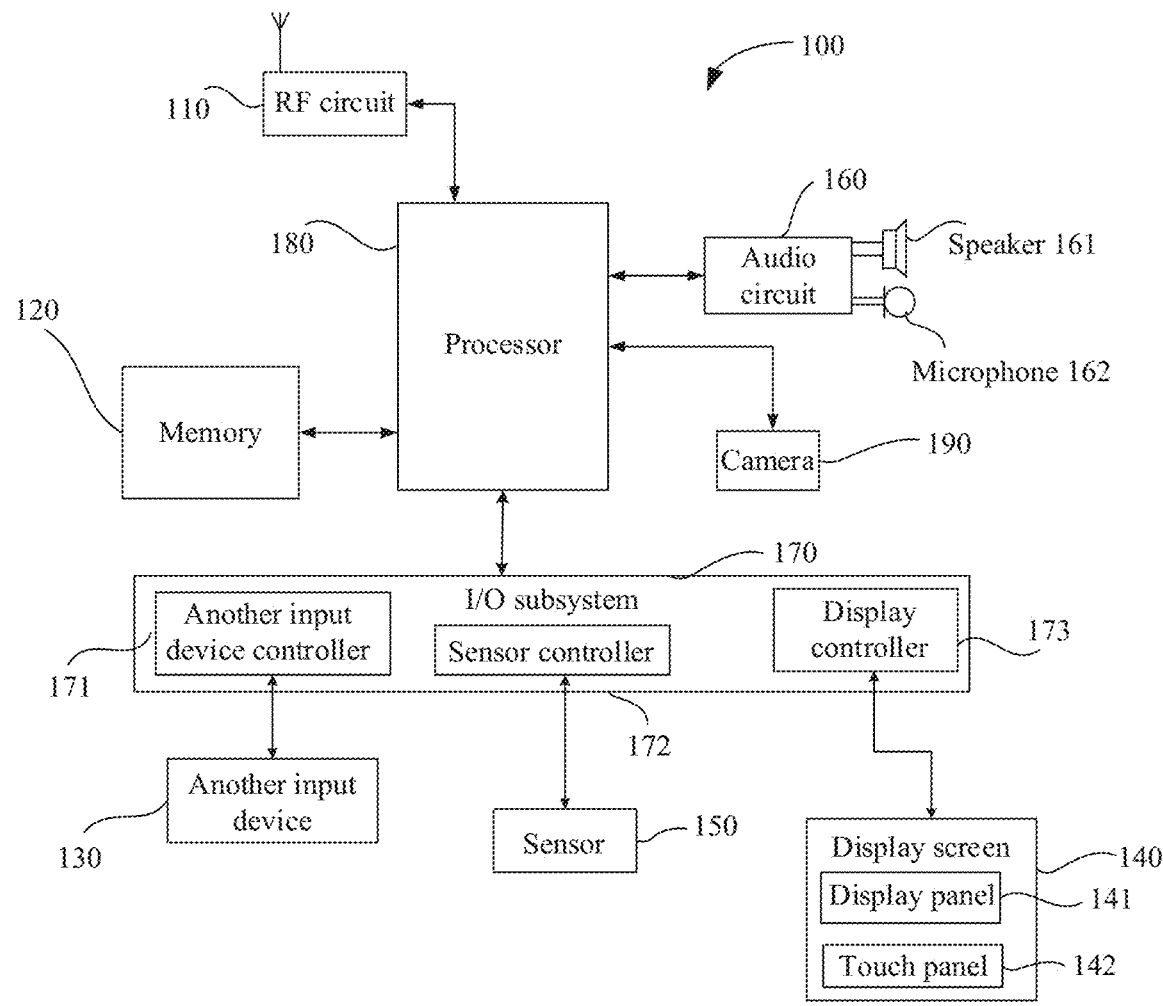
FIG. 1 is a schematic diagram of a composition structure of an electronic device according to an embodiment of this application.

The following describes technical solutions in the embodiments of this application with reference to accompanying drawings in the embodiments of this application. In descriptions of the embodiments of this application, "/" means "or" unless otherwise specified. For example, A/B may represent A or B. In this specification. "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

The embodiments of this application provide an image processing method. The method may be applied to an electronic device. A second background image may be obtained before a first key frame image is obtained. The second background image is a background image included in a second key frame image, and the second key frame image is obtained by photographing, by using a camera, a target scene before the first key frame image is obtained. A first foreground image and a first background image may be obtained from the first key frame image through foreground and background separation processing. Background repair processing may be performed on the first background image by using the second background image, to obtain a third background image. Therefore, the obtained third background image can include as comprehensive background image information as possible. Foreground and background compositing processing is performed on the third background image and a second foreground image. The second foreground image is obtained after foreground image processing is performed on the first foreground image. Therefore, a blank untextured region caused during generation of the second foreground image is patched, thereby improving an image compositing effect obtained after the foreground image processing.

There may be a plurality of types of target objects. For example, there may be a person, a vehicle, a flower, an animal, a building, ground, and sky. One type of target object may include a plurality of things of the target object.

In the embodiments of this application, one complete image may be segmented into two parts: a foreground image and a background image. A region in which a target object is located is a foreground image in which a thing that belongs to the target object is located. One or more specific things are one or more things specified by a user, or one or more things preset by an electronic device. Alternatively, one or more specific things are things included in one or more thing types specified by a user, or things included in one or more thing types preset by an electronic device, or things included in one or more thing types determined based on thing locations, sizes, and the like.

Image segmentation may be also referred to as semantic segmentation, and is a technology and a process of segmenting an image into several specific regions having special properties, and specifying a target attracting an interest. For example, a complete image is segmented into a foreground image and a background image. There may be a plurality of image segmentation methods. For example, a face region is detected in a facial recognition manner and a body region is estimated, a foreground image region is obtained from a complete image through segmentation by using a GrabCut method and is separated from a background image region, and then tracking and segmentation are performed on the foreground image region by using an inter-frame difference algorithm or an optical stream tracking algorithm, and simultaneously the background image region is obtained.

An embodiment of this application provides an image processing method. The method may be applied to an electronic device, such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA), an intelligent terminal, a video conference terminal, or an image taking terminal. A specific type of the electronic device is not limited in this embodiment of this application. An operating system thereof may be a system such as Android, iOS, Windows Phone, or BlackBerry OS. This is not specifically limited in this embodiment of this application.

For example, a terminal 100 is a mobile phone. FIG. 1A is a block diagram of a part of a structure of a mobile phone 100 related to this embodiment of this application. Refer to FIG. 1. The mobile phone 100 includes components such as an RF (Radio Frequency, radio frequency) circuit 110, a memory 120, another input device 130, a display 140, a sensor 150, an audio circuit 160, an I/O subsystem 170, a processor 180, and a camera 190. A person skilled in the art may understand that a mobile phone structure shown in FIG. 1 does not constitute any limitation on the mobile phone, and the mobile phone may include components more or fewer than those shown in the figure, or some components are combined, or some components are split, or the components are disposed differently. The person skilled in the art may understand that the display 140 belongs to a user interface (UI, User Interface), and the mobile phone 100 may include user interfaces more or fewer than those shown in the figure.

The following describes in detail each component of the mobile phone 100 with reference to FIG. 1.

The RF circuit 110 may be configured to receive and send a signal in an information receiving or sending process or a call process. Particularly, after receiving downlink information from a base station, the RF circuit 110 sends the downlink information to the processor 180 for processing, and sends designed uplink data to the base station. Usually, an RF circuit includes but is not limited to an antenna, at least one amplifier, a transceiver, a coupler, a low noise amplifier (Low Noise Amplifier, LNA), a duplexer, and the like. In addition, the RF circuit 110 may further communicate with a network and another device through wireless communication. The wireless communication may use any communications standard or protocol, including but not limited to: global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short messaging service (Short Messaging Service, SMS), and the like.

The memory 120 may be configured to store a software program and a module. The processor 180 runs the software program and the module that are stored in the memory 120 to perform various function applications of the mobile phone 100 and process data. The memory 120 may mainly include a program storage area and a data storage area. The program storage area may store an operating system, an application required by at least one function (such as a sound play function and an image play function), and the like. The data storage area may store data (such as audio data and a phone book) created when the mobile phone 100 is used, and the like. In addition, the memory 120 may include a high-speed random access memory, or may include a nonvolatile memory, such as at least one magnetic disk storage device, a flash memory device, or another volatile solid-state storage device.

The another input device 130 may be configured to receive digital or character information that is input, and generate a key signal input that is related to a user setting and function control of the mobile phone 100. Specifically, the another input device 130 may include but is not limited to one or more of a physical keyboard, a function key (for example, a volume control key or an on/off key), a trackball, a mouse, a joystick, an optical mouse (the optical mouse is a touch-sensitive surface that does not display a visual output, or is an extension of a touch-sensitive surface that includes a touchscreen), and the like. The another input device 130 is connected to another input device controller 171 of the I/O subsystem 170, and performs signal interaction with the processor 180 under control of the another device input controller 171.

The display 140 may be configured to display information entered by a user or information provided for a user, and various menus of the mobile phone 100, and may further receive a user input. Specifically, the display 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142 is also referred to as a touchscreen, a touch-sensitive screen, or the like, and may collect a touch operation or non-touch operation of the user on or near the touch panel (such as an operation of the user on the touch panel 142 or near the touch panel 142 by using any suitable object or accessory such as a finger or a stylus, or including a motion sensing operation including operation types such as an isolated control operation and a multipoint control operation), and drive a corresponding connection apparatus based on a preset program. Optionally, the touch panel 142 may include two parts: a touch detection apparatus and a touch controller. The touch detection apparatus detects a touch orientation and posture of the user, detects a signal brought by a touch operation, and transfers the signal to the touch controller. The touch controller receives touch information from the touch detection apparatus, converts the touch information into information that can be processed by the processor, and then sends the information to the processor 180. The touch controller can also receive and execute a command sent by the processor 180. In addition, the touch panel 142 may be implemented by using a plurality of types such as a resistive type, a capacitive type, an infrared type, and a surface acoustic wave type, or may be implemented by using any technology developed in the future. Further, the touch panel 142 may cover the display panel 141. Further, the touch panel 142 may cover the display panel 141. The user may perform, based on content displayed on the display panel 141 (where the displayed content includes but is not limited to a soft keyboard, a virtual mouse, a virtual key, an icon, or the like), an operation on or near the touch panel 142 covering the display panel 141. After detecting the touch operation on or near the touch panel 142, the touch panel 142 transfers the touch operation to the processor 180 by using the I/O subsystem 170 to determine a type of a touch application, to determine the user input. Subsequently, the processor 180 provides a corresponding visual output on the display panel 141 based on the type of the touch application and based on the user input by using the I/O subsystem 170. In FIG. 1, the touch panel 142 and the display panel 141 are used as two independent components to implement input and input functions of the mobile phone 100. However, in some embodiments, the touch panel 142 and the display panel 141 may be integrated to implement the input and output functions of the mobile phone 100.

The mobile phone 100 may further include at least one type of sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the mobile phone 100 moves to an ear. As a motion sensor, an accelerometer sensor may detect a value of an acceleration in various directions (there are usually three axes), may detect a value and a direction of gravity when the mobile phone is still, and may be applied to an application (for example, landscape/portrait mode switching, a related game, or magnetometer posture calibration) for recognizing a posture of the mobile phone, a function (for example, a pedometer or a keystroke) related to vibration recognition, and the like. For another sensor that may be further configured on the mobile phone 100, for example, a gyroscope, a barometer, a hygrometer, a thermometer, or an infrared sensor, details are not described herein.

The audio circuit 160, a speaker 161, and a microphone 162 may provide an audio interface between the user and the mobile phone 100. The audio circuit 160 may convert received audio data into a signal, and transmit the signal to the speaker 161, and the speaker 161 converts the signal into a sound signal for output. In addition, the microphone 162 converts a collected sound signal into a signal, and the audio circuit 160 converts the signal into audio data after receiving the signal, and then outputs the audio data to the RF circuit 110, to send the audio data to, for example, another mobile phone, or output the audio data to the memory 120 for further processing.

The I/O subsystem 170 is configured to control an external device for input and output, and may include the another device input controller 171, a sensor controller 172, and a display controller 173. Optionally, one or more another input control device controllers 171 receive a signal from the another input device 130 and/or send a signal to the another input device 130. The another input device 130 may include a physical button (a press button, a rocker button, or the like), a dial, a slider switch, a joystick, a click scroll wheel, and an optical mouse (the optical mouse is a touch-sensitive surface that does not display a visual output, or is an extension of a touch-sensitive surface that includes a touchscreen). It should be noted that the another input control device controller 171 may be connected to any one or more of the foregoing devices. The display controller 173 in the I/O subsystem 170 receives a signal from the display 140 and/or sends a signal to the display 140. After the display 140 detects the user input, the display controller 173 converts the detected user input into interaction with a user interface object displayed on the display 140, to implement human-machine interaction. The sensor controller 172 may receive a signal from one or more sensors 150 and/or send a signal to the one or more sensors 150.

The processor 180 is a control center of the mobile phone 100, and is connected to each part of the mobile phone 100 through various interfaces and lines. The processor 180 performs various functions of the mobile phone 100 and processes data by running or executing the software program and/or module stored in the memory 120 and invoking data stored in the memory 120, so as to perform overall monitoring on the mobile phone. Optionally, the processor 180 may include one or more processing units. Preferably, the processor 180 may integrate an application processor and a modem processor. The application processor mainly processes an operating system, a user interface, an application, and the like. The modem processor mainly processes wireless communication. It may be understood that the foregoing modem processor may be not integrated into the processor 180.

The mobile phone 100 may further include the camera 190. For example, the mobile phone 100 may include one or more cameras. In this embodiment of this application, the user may operate the camera to photograph a face of the user, to generate a sequence frame video stream. When the user performs preview and adjusts the camera, the electronic device may perform preview photographing by using the camera, to generate a preview video stream as a to-be-used image for background processing. For example, when photographing is performed by using the camera of the electronic device, the user enables the camera to first perform preview, and performs angle or posture adjustment on the camera or a target based on a preview photographing effect. For example, when performing photographing preview with a mobile phone, the user continuously adjusts a location and an angle of the mobile phone, and the user also changes a posture and a face angle of the user, to achieve a better photographing effect. For another example, before using a camera of a notebook computer, the user also adjusts a location of the user, to achieve a better photographing effect. In consideration of this, the user may enable the camera in advance in a preview stage, and collect background information in advance, to obtain as comprehensive background information as possible.

Although not shown, the mobile phone 100 may further include a power supply (such as a battery) that supplies power to each component. Optionally, the power supply may be logically connected to the processor 180 by using a power management system, to implement functions such as charging management, discharging management, and power consumption management by using the power management system. For another example, the mobile phone 100 may further include a Bluetooth module, or the like. Details are not described herein.

For ease of understanding, in the following embodiments of this application, the image processing method provided in the embodiments of this application is specifically described with reference to the accompanying drawings by using, as an example, a mobile phone having the structure shown in FIG. 1.

Figure 2A:
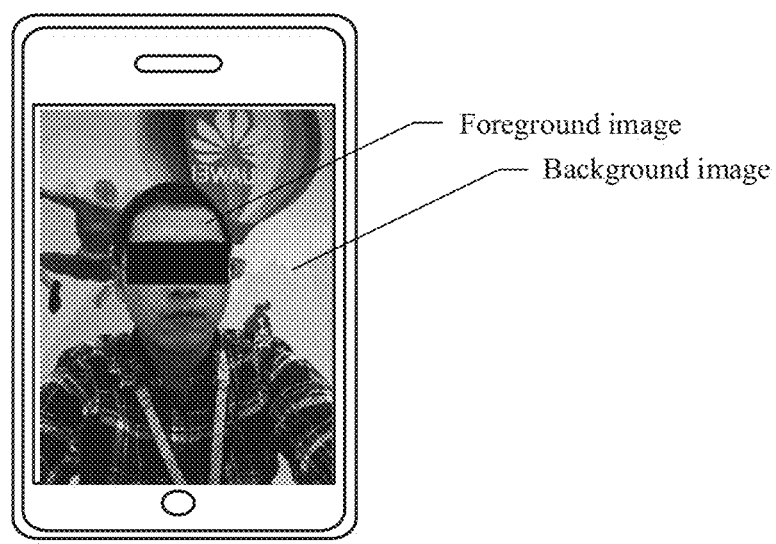
FIG. 2a is a schematic diagram of an image displayed by an electronic device according to an embodiment of this application.

FIG. 2a shows a graphical user interface (graphical user interface, GUI) of a mobile phone. The GUI is a home screen of the mobile phone. After detecting an operation that a user taps an icon of a camera application (application, APP) on the home screen, the mobile phone may enable the camera application, and display, in a photographing interface, a complete image captured by a camera. In a preview state, the photographing interface may display a preview image in real time. It may be understood that in a photo taking mode and a video recording mode (that is, a video taking mode), the photographing interface may have different sizes. In the photo taking mode, after the mobile phone detects an operation that the user takes a photo or records a video, the mobile phone performs a photo taking operation or a video recording operation. For example, a complete image shown in FIG. 2a may be segmented into a foreground image and a background image. For example, tracking and segmentation may be performed on the foreground image by using an inter-frame difference algorithm or an optical stream tracking algorithm, and simultaneously the background image is obtained. A face and a body part that are shown in FIG. 2a constitute the foreground image, and an image region other than the foreground image in the entire image constitutes the background image. The foreground image and the background image that are shown in FIG. 2a are merely an example case. In actual application, in this embodiment of this application, other image content may be alternatively used, and an image color is not limited. In this embodiment of this application, patching or stitching is performed on a current-frame background image with reference to a pre-collected background image, so that after stretching processing is performed on a foreground image, a background image obtained after the processing in this embodiment of this application can be better combined with a foreground image, thereby eliminating a problem that an image compositing effect is poor after the foreground image processing.

Figure 2B:
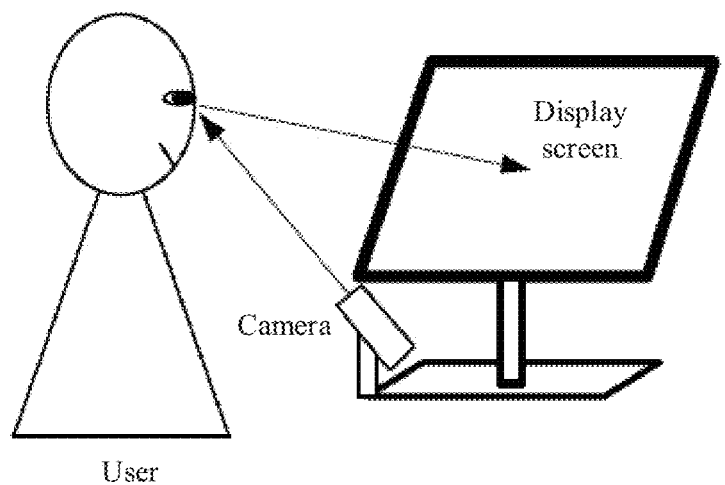
FIG. 2b is a schematic diagram of a video scenario according to an embodiment of this application.
Figure 2C:
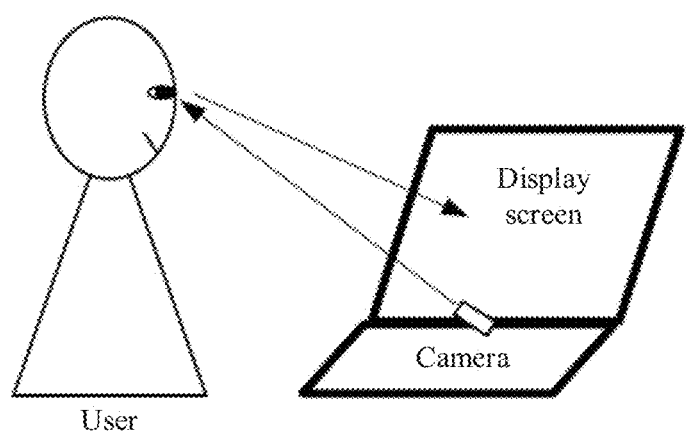
FIG. 2c is a schematic diagram of another video scenario according to an embodiment of this application.

FIG. 2b is a schematic diagram of a video scenario according to an embodiment of this application. In FIG. 2b, an electronic device may be a notebook computer, a camera is disposed on a keyboard of the notebook computer, and the camera and a display are not on a same plane. Similarly, FIG. 2c is a schematic diagram of another video scenario according to an embodiment of this application. In FIG. 2c, an electronic device may be a desktop computer, a camera is disposed below a display of the desktop computer, and the camera and the display are not on a same plane. An electronic device may collect a key frame image by using a camera of the electronic device. When there is at least one of the following relationships between the camera and a display of the electronic device, there is a distance between the camera and the display included in the electronic device, or an orientation of the camera is different from an orientation of the display included in the electronic device, in a process in which a user uses the electronic device to perform a video chat or video conference with another user, if a face of the user does not face the camera, but faces another place, for example, faces the display, an image sequence captured by the electronic device by using the camera has an image in which a face orientation is not parallel to a vertical of the display of the electronic device. In this case, face calibration needs to be performed on a foreground image by using the embodiments of this application.

Figure 3:
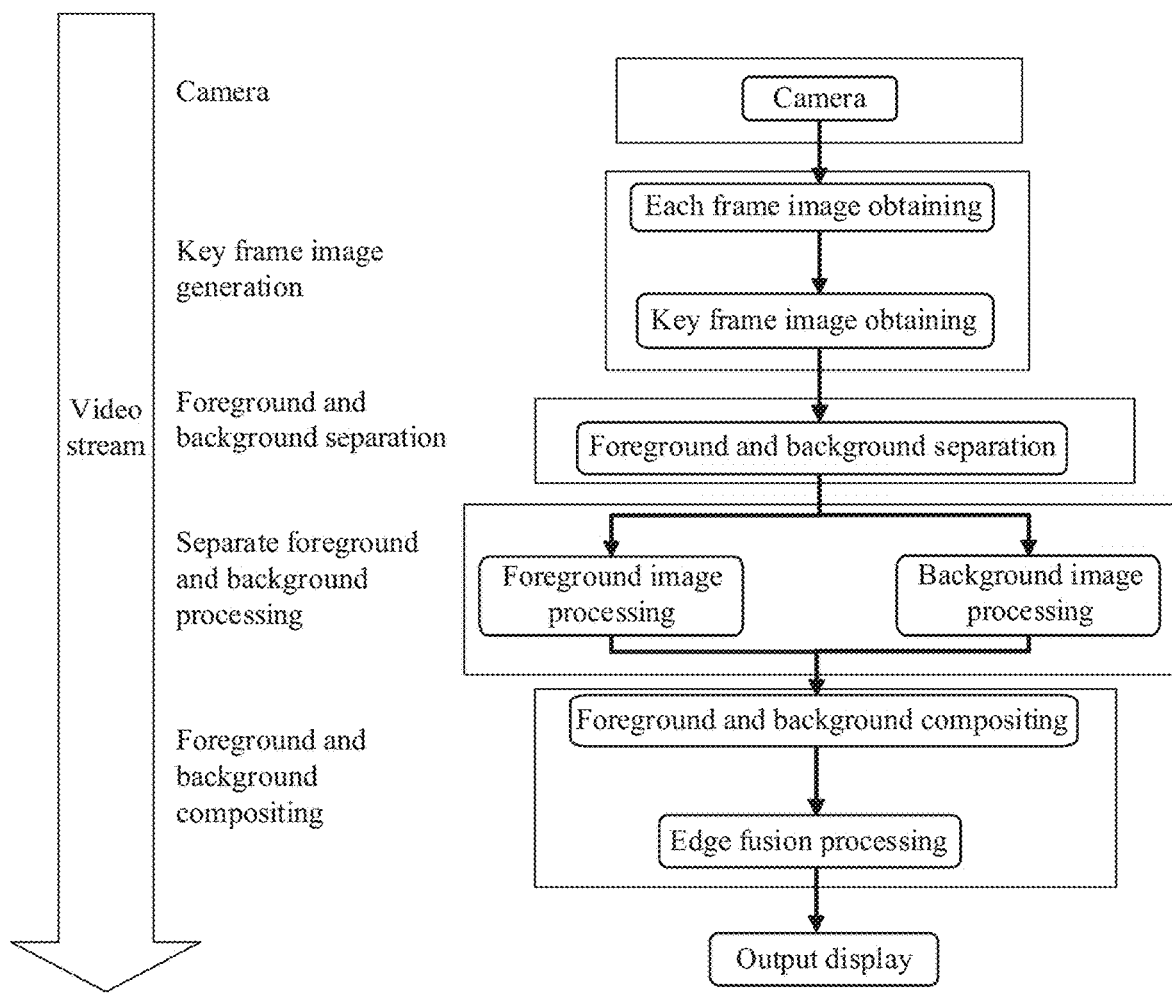
FIG. 3 is a flowchart of an image processing method according to an embodiment of this application.

FIG. 3 is a flowchart of an image processing method according to an embodiment of this application. In a left part in FIG. 3, an arrow indicates a plurality of processing processes of a video stream from top to bottom: camera enabling, key frame image generation, foreground and background separation, separate foreground and background processing, and foreground and background compositing. When photographing is performed by using a camera of an electronic device, in consideration that a user enables the camera to first perform preview, and performs angle or posture adjustment on the camera or a target based on a preview photographing effect, the user may collect background information in advance in a preview stage, to compensate for a blank untextured region left when a foreground image region is deformed after being processed subsequently. The blank untextured region is an untextured image region that exists during compositing of a processed foreground image and an original background image because the foreground image is deformed after being processed. For example, if a face thinning beautification operation is performed on a face of a target object in the foreground image, a blank untextured region exists during compositing of a thinned face part and the original background image.

In this embodiment of this application, sequence frame images may be captured (for example, a total of n×m frame images are captured) in the preview phase, and one key frame image may be generated by using each n frames of sequence images. Therefore, m key frame images are generated from the n×m frame images through detection. Foreground and background separation is performed on the key frame images to obtain m foreground images and m corresponding background images. Background repair processing is performed on each of the m background images based on a front neighboring background and a rear neighboring background, to obtain as comprehensive background image information as possible. For example, background repair processing is performed on the m background images in the following manner: Stitching is performed in an image sequence. For example, a first-frame background image is stitched with a second-frame background image, where an image obtained after the stitching is used as a second-frame background image; the second-frame background image is stitched with a third-frame background image, where an image obtained after the stitching is used as a third-frame image, and so on. Two frames of images are stitched each time. Therefore, repair processing on the background image can be completed, to repair a blank untextured region that exists during foreground and background compositing after the foreground image is deformed.

In this embodiment of this application, stitching or patching may be performed on a current-frame background image based on a pre-collected background image. In this embodiment of this application, a background image obtained after the stitching or patching includes more comprehensive background information. Therefore, an existing blank untextured region can be filled when a background image obtained after stitching or patching based on this embodiment of this application is composited with a foreground image obtained after foreground image processing. In this embodiment of this application, no background distortion is caused, and an image obtained after a foreground image and a background image are composited has a real and natural effect.

An application scenario of this embodiment of this application is a scenario in which a target object is photographed and processed by using a mobile phone, a tablet computer, a notebook computer, or another electronic device having a photographing function, and a target region is obviously deformed during processing, and consequently the target region cannot be seamlessly stitched with an original background image after being deformed. A specific application scenario of this embodiment of this application includes but is not limited to a scenario in which a foreground region occupies a relatively large proportion of an area of an entire image and the foreground region is obviously deformed during processing, such as facial beautification or camera calibration.

For example, in a facial beautification application scenario, natural seamless stitching of a foreground that is deformed due to 2D or 3D face thinning or the like and a background may be processed in 2D or 3D facial beautification. In a calibration scenario of a camera of a notebook computer, natural seamless stitching of a foreground obtained after face angle correction and a background may be processed.

As shown in FIG. 3, the following uses an example to describe the image processing method provided in this embodiment of this application:

1. Preview Image Obtaining.

A camera is enabled to perform preview, and a target background image is collected as a preview image based on a preview photographing effect.

2. Key Frame Image Generation.

All frames of image data are obtained from the camera as a sequence frame video stream. The sequence frame video stream is a video data stream including a plurality of sequence frame images. One key frame image is generated based on each n obtained sequence frame images, and key frame images are sequentially cyclically output at an interval of n frames of images in the sequence frame video stream, to constitute a key frame image video stream. The key frame image is obtained from the sequence frame video stream, and subsequent processing is performed on the key frame image according to this embodiment of this application, so that a data calculation amount can be reduced, and a repetition case in which several consecutive frames of images are basically the same can be removed, to avoid repeated processing.

In another embodiment, in a key frame image generation phase, to be able to generate a clearer key frame image, first, one original key frame image is determined from n sequence frame images, and then the original key frame image is used as a center to obtain n−1 related frame images from the n sequence frame images. The related frames are n−1 frame images other than a frame image currently used as the key frame image in the n sequence frame images. Image fusion is performed on the original key frame image by using energy values of the related frame images, to generate a clearer key frame image, so that a problem of generating a clearer key frame image can be resolved.

3. Foreground and Background Separation into Two Video Streams.

The key frame video stream is received, foreground segmentation is performed on all the key frame images, and foreground images and background images that are obtained after the segmentation are separated to generate two video streams: a foreground image video stream and a background image video stream.

In this embodiment of this application, the foreground and background separation processing means that foreground segmentation is performed on a foreground part and a background part in a key frame image, so that a foreground image and a background image that are obtained after the segmentation are separated into two separate images. Two images may be generated through foreground and background separation processing: a foreground image and a background image.

4. Separate Foreground and Background Processing.

The foreground image video stream and the background image video stream that are output in step 3 are read, and the foreground image video stream and the background image video stream that are obtained after the segmentation are separately processed in respective different processing manners. Specifically, deformation processing may be performed on the foreground image, stitching or patching processing may be performed on the background image, and a processed foreground image video stream and background image video stream are output as two video streams.

The following describes background repair processing for a current-frame background image, and the background repair processing may be implemented in a plurality of manners. For example, the current-frame background image is stitched with a previous-frame background image. The previous-frame background image has two implementations. In one implementation, the previous-frame background image is a background image corresponding to a key frame image of a previous frame of a current frame in the sequence frame video stream. In the other implementation, the previous-frame background image is a background image corresponding to a preview image in a preview video stream collected by using the camera in a preview phase.

When the current-frame background image is stitched with the previous-frame background image, perspective transformation may be performed on the previous-frame background image, to perform texture alignment on the previous-frame background image with the current-frame background image. When there is no foreground image, all background image information is filled as much as possible. For example, when a portrait of a user is photographed in an ideal case, even if the portrait is matted from a key frame image, the image is still a complete background image through background stitching or patching.

In another embodiment, to perform perspective transformation on the previous-frame background image, a perspective transformation matrix needs to be first calculated. There are two manners of calculating the perspective transformation matrix. In one manner, a changed inter-frame location relationship is generated by using posture parameters of the previous-frame background image and the current-frame background image, and the perspective transformation matrix is calculated by using the changed inter-frame location relationship. A posture parameter of each frame of background image may be obtained by using an inertial measurement unit (inertial measurement unit, IMU). In the other manner, instead of using the posture parameters, feature point alignment is performed on the previous-frame background image and the current-frame background image to estimate a changed inter-frame location relationship, and the perspective transformation matrix is calculated by using the changed inter-frame location relationship. For example, in this embodiment of this application, a background image feature that can be calculated may be a DAISY feature. Another feature point collection manner may be alternatively used in this embodiment of this application. This is not limited herein.

It should be noted that in this embodiment of this application, background repair processing needs to be performed on a plurality of key frame images in the sequence frame video stream. Therefore, in this embodiment of this application, the plurality of key frame images are in a cyclic processing relationship, and data of a current-frame background image needs to be saved to be used as a "previous-frame background image" of a next frame.

In some other embodiments, the background repair processing may be implemented in another manner. For example, background image repair is performed on the current-frame background image in different cases. In this embodiment of this application, at least the following three background image repair manners may be included. One case is a scenario in which the camera is fixed and a photographing environment is unchanged. In this case, cumulative superimposition may be performed on background image regions to obtain a more comprehensive background image. Another case is a scenario in which the camera is moved and a photographing environment is unchanged. In this case, the foregoing background image stitching processing manner may be used. When a changed posture relationship between a previous-frame background image and the current-frame background image is estimated, if posture parameters cannot be collected, an inter-frame location change relationship between a previous frame and a current frame may be directly estimated through feature matching. A third case is a scenario in which the camera is fixed and a photographing environment is partially changed. For example, when a person is walking in a photographing background, first, person target regions are obtained from key frame backgrounds through segmentation by using an inter-frame difference method, to be saved as to-be-matched targets; and then, when it is determined, by using a target tracking algorithm, that the to-be-matched targets enter a foreground missing region of a current key frame, the to-be-matched targets are searched for a target image with relatively high contour similarity to patch the foreground missing region.

The previous-frame background image is stitched with the current-frame background image, to expand a region area of the current-frame background image or repair a blank untextured region left due to foreground segmentation, thereby ensuring that a processed foreground image can be composited with a background image obtained after the background repair.

5. Foreground and Background Compositing.

After each time of output processing, a foreground image and a background image that belong to a same key frame are composited, where an effective region texture of the foreground image is retained, and fusion processing is performed on edge regions for joining a foreground image region and a background image region; and a compositing result is output as a video stream.

After the foreground and background compositing, because stitching or patching is performed on the current-frame background image in the previous step, background image information is filled as much as possible, that is, after being processed in step 4, background image information obtained at another angle can be fill in a blank untextured region originally generated due to a foreground image change.

6. Output Display.

Each frame of image that is output in step 5 is read as a result for output display.

Next, the following describes a specific implementation process of this embodiment of this application by using a facial beautification application as an example. During face thinning in facial beautification, because an area of a face changes, a face obtained after the facial beautification does not match a background during stitching. In this embodiment, more background information is collected during preview, to patch a blank untextured region that exists between the face obtained after the facial beautification and a background image region, so that a real background image is used for foreground and background compositing processing while the facial beautification is implemented.

Figure 4:
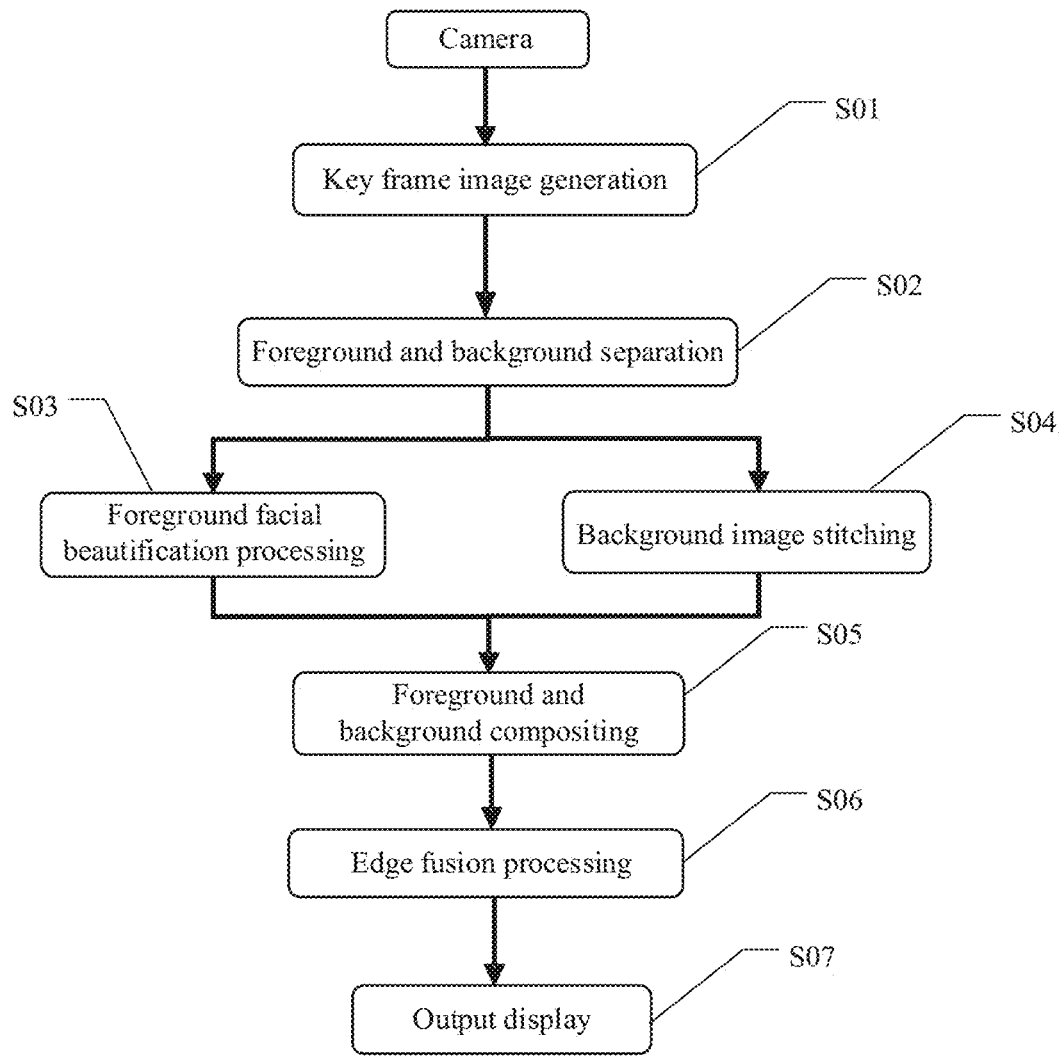
FIG. 4 is a flowchart of an image processing method according to an embodiment of this application.

FIG. 4 is a flowchart of an image processing method according to an embodiment of this application. A facial beautification application is used as an example. A processing procedure in the facial beautification application mainly includes the following processes:

Step S01: Enable a camera to obtain sequence frame images in a preview phase, and output a preview video stream. Then, key frame images are generated. For example, a plurality of generated key frame images are used to generate a key frame video stream.

First, key frame image detection is performed on each n (for example, n=3, 4, 5, 6, or 7) sequence frame images. A key frame image detection method includes but is not limited to a lens-based method, a frame averaging method, a histogram averaging method, a motion-based analysis method, a clustering-based method, and the like.

Next, in this embodiment of this application, resolution enhancement may be performed on the key frame image. An original key frame image is used as a main image to determine k (for example, k=1, 2, or 3) front related frame images and k rear related frame images. One key frame image is generated by using each n sequence frame images, and related frame images are n−1 frame images other than a frame image currently used as the original key frame image in the n frame images. Optimization processing is performed on an energy value of the original key frame image in an energy manner, to enhance resolution of the original key frame image. An energy formula is as follows:

$$E_{total}=\Sigma E(p_i), \forall p_i \in I$$

$$E(p)=\Sigma \|I_k(q_i)-I(q_i)\|_2^2, \forall q_i \in B(p), k=1,2,3$$

pi is an $i^{th}$ image point p in an image, E(pi) is an energy value of the image point pi, and I is the image and is generally any one of the n frame images. E(p) is generally an energy value of any image point, Ik(qi) is a pixel value of an image point qi in a $k^{th}$ frame image in the n frame images, I(qi) is a modified pixel value of the image point qi in the generated key frame image, and B(p) means that a 5×5 image block is established by using any image point p in the image I as a center.

Figure 5:
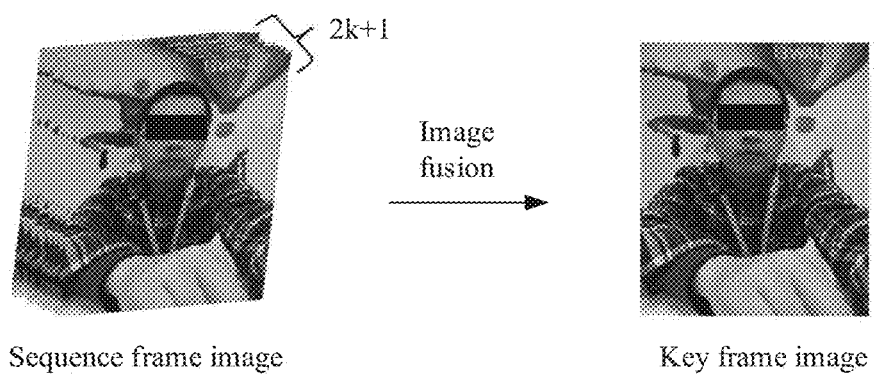
FIG. 5 is a schematic diagram of generating a key frame according to an embodiment of this application.

FIG. 5 is a schematic diagram of generating a key frame according to an embodiment of this application. For example, a sequence frame video stream has a total of n×m frame images, so that m key frame images can be generated. In FIG. 5, 2k+1 is equal to n, that is, one key frame image is generated by using each 2k+1 frame images. Therefore, the video stream has m (2k+1)-frame images. Through the foregoing image fusion processing, m key frame images with high definition may be generated.

After the key frame images are generated, the generated m key frame images are output in a video stream form.

Step S02: Perform foreground and background separation.

Figure 6:
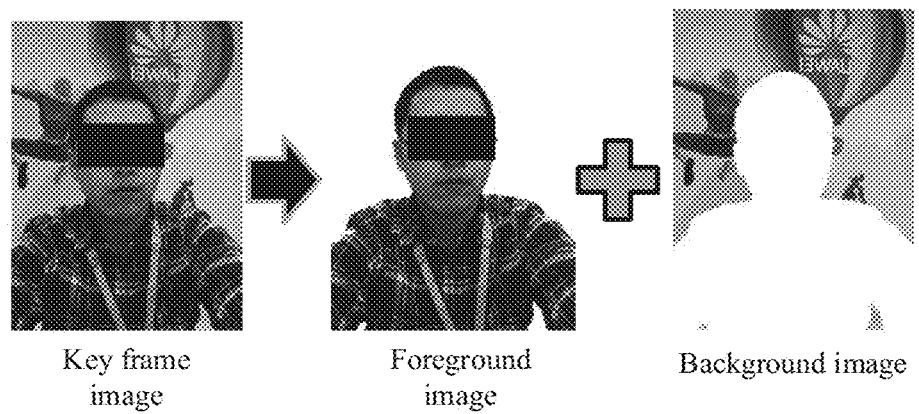
FIG. 6 is a schematic diagram of foreground and background separation processing according to an embodiment of this application.

FIG. 6 is a schematic diagram of foreground and background separation processing according to an embodiment of this application. Foreground segmentation is performed on each read key frame image, to implement foreground and background separation. There may be a plurality of foreground segmentation methods. For example, a foreground segmentation method may be as follows: a. A face region is detected based on a facial recognition algorithm and a body region is estimated, and the body region is segmented by using a GrabCut (GrabCut) algorithm. b. When there is prior information (for example, a segmentation result of a previous key frame already exists), tracking and segmentation may be performed on a foreground region by using an inter-frame difference algorithm or an optical stream tracking algorithm, and simultaneously a background image region is obtained; and a foreground image video stream and a background image video stream are output. A foreground image and a background image that are shown in FIG. 6 are merely an example case. In actual application, in this embodiment of this application, other image content may be alternatively used, and an image color is not limited.

Step S03: Foreground facial beautification processing.

Each frame image of the foreground video stream is read, and the foreground image is processed by using a facial beautification algorithm, such as a 2D facial beautification algorithm or a 3D geometric beautification algorithm; and a processed foreground video stream is output.

Step S04: Background image stitching.

Each frame image of the background video stream is read, and background stitching processing is separately performed on the background obtained after the segmentation.

For example, background stitching or patching is performed on a background image of a current key frame and a background image of a previous key frame. A specific stitching method is as follows: Perspective transformation is performed on the background image of the previous key frame, to perform texture alignment on the background image of the previous key frame with the background image of the current key frame; and then a transformed background image of the previous key frame is stitched with the background image of the current key frame, to expand a region area of the current background image or patch an untextured region left due to foreground image segmentation. Based on different angles between the images, an image stitching or patching result may be that the background image region is expanded, that a blank region left after foreground image matting is patched, or that the background image region is expanded and a blank region left after foreground image matting is patched.

Figure 7:
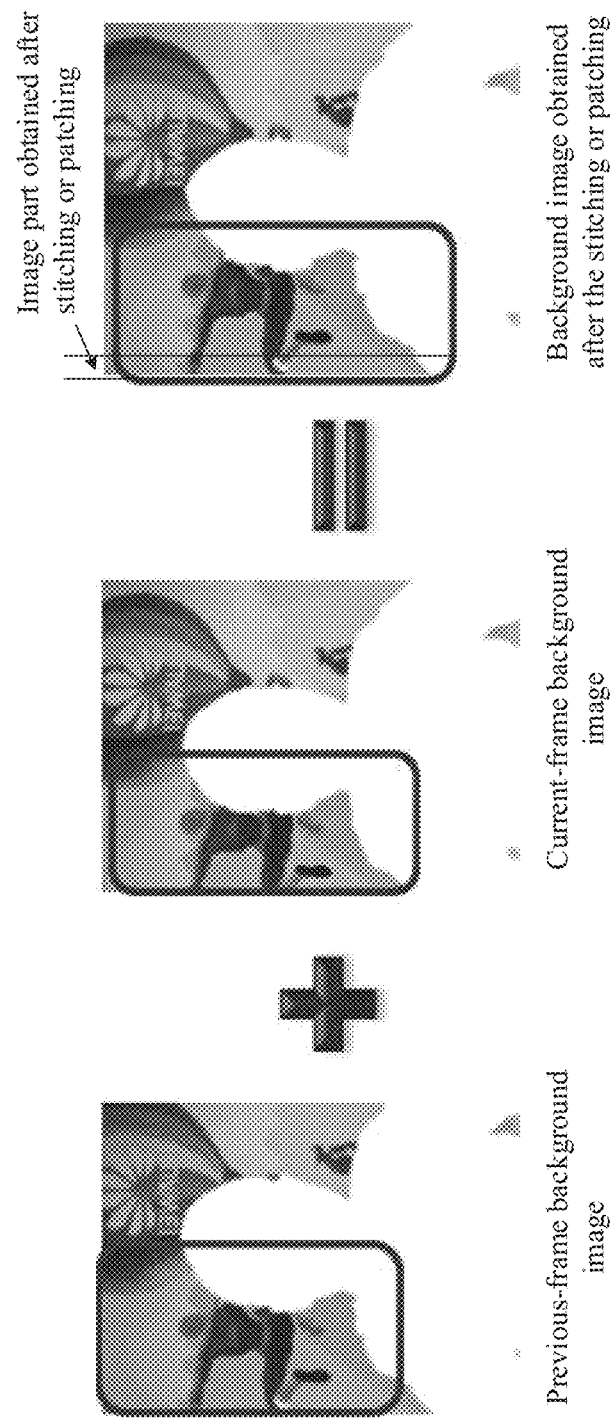
FIG. 7 is a schematic diagram of background image stitching processing according to an embodiment of this application.

FIG. 7 is a schematic diagram of background image stitching processing according to an embodiment of this application. For example, a previous-frame background image is leftward, a current-frame background image is rightward, and the previous-frame background image is stitched to the current background image. In a background image that is obtained after stitching or patching and that is shown on a right side in FIG. 7, after the stitching, background information of the current-frame background image is leftward expanded due to a supplement of the previous-frame background image.

For another example, after perspective transformation is performed on a previous-frame background image, a transformed previous-frame background image is combined with a current-frame background image. A blank region is left after a portrait in a current image is matted. The previous-frame background image is taken from another angle, so that background image information of the blank region can be taken. Perspective transformation is performed on the previous-frame background image and the transformed previous-frame background image is patched to the current blank region, that is, background patching of a back region of a foreground is implemented.

Finally, a background result obtained after the processing is output on two channels. On one channel, the background result obtained after the processing is cyclically output as a previous-frame background image and a previous-frame image posture parameter with reference to a current posture parameter, to be used for stitching with a next-frame background image. On the other channel, the background result obtained after the processing is output to a next step for use as a to-be-stitched background.

A perspective transformation matrix may be obtained by performing initialization based on a current posture parameter obtained by using an IMU and then performing optimization through DAISY feature matching between two frame images.

Figure 8:
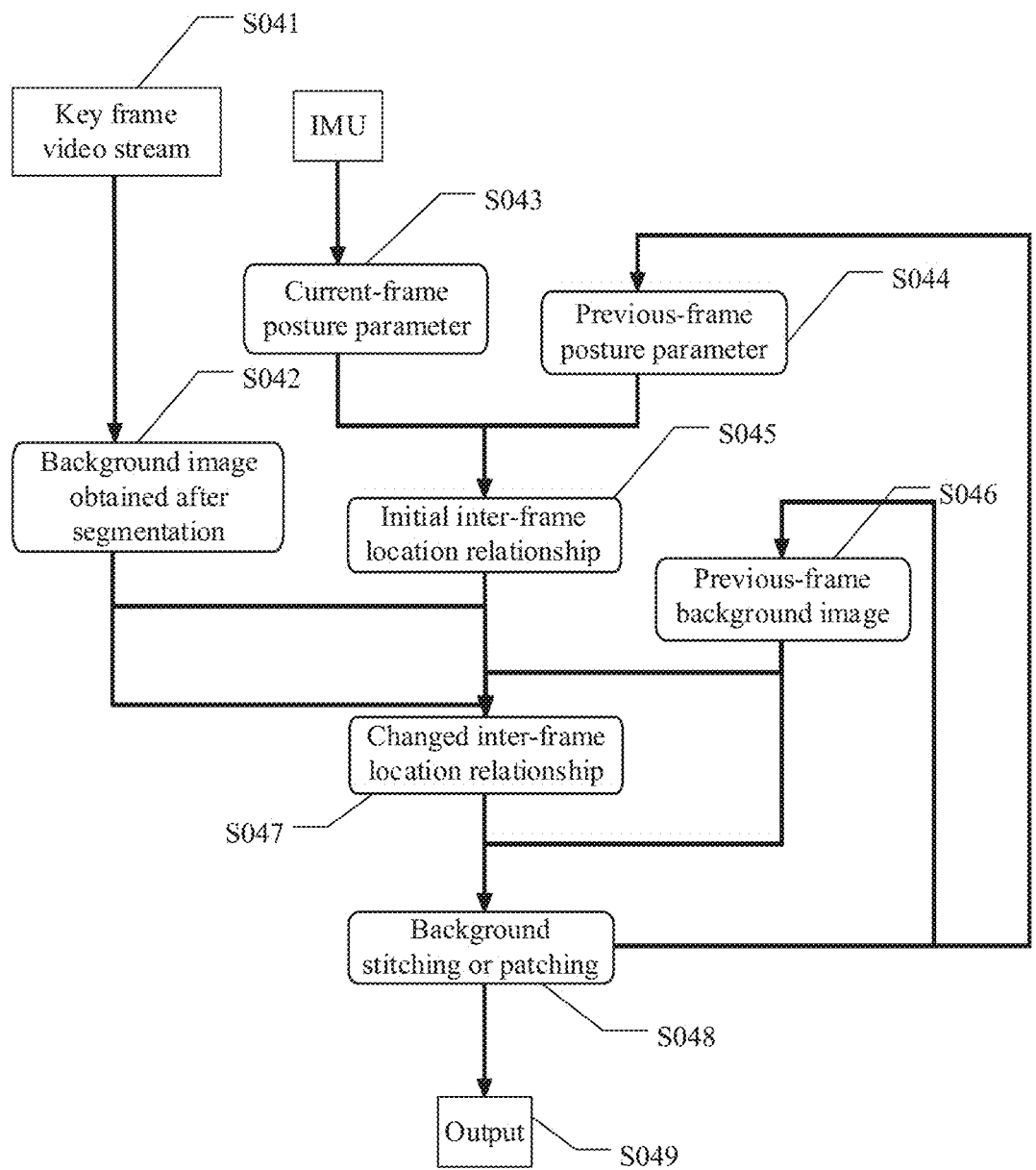
FIG. 8 is a schematic flowchart of background image stitching processing according to an embodiment of this application.

FIG. 8 is a schematic flowchart of background image stitching processing according to an embodiment of this application. The following procedure is mainly included:

S041: Obtain the key frame video stream.

S042: Perform foreground and background segmentation on the key frame image, to obtain a background image obtained after the segmentation.

S043: Obtain a current-frame posture parameter by using the IMU.

S044: Obtain a stored previous-frame posture parameter.

S045: Obtain an initial inter-frame location relationship based on the current-frame posture parameter and the previous-frame posture parameter.

S046: Obtain a previous-frame background image.

S047: Optimize the initial inter-frame location relationship based on the background image obtained after the segmentation and the previous-frame background image, to obtain a changed inter-frame location relationship.

S048: Perform background stitching or patching by using the changed inter-frame location relationship.

S049: Output a current-frame background image obtained after the stitching or patching.

In FIG. 8, the initial inter-frame location relationship between a current frame and a previous frame is obtained through calculation based on the posture parameter obtained during current photographing by using the IMU and the previous-frame posture parameter; then DAISY feature extraction and matching are performed on the current-frame background image and the previous-frame background image that are output in step S03, and the initial inter-frame location relationship between the current frame and the previous frame is optimized by using a feature point correspondence, to obtain the changed inter-frame location relationship; then, a perspective transformation matrix between the current-frame image and the previous-frame image is calculated by using the changed inter-frame location relationship obtained after the optimization, perspective transformation is performed on the previous-frame background image based on the perspective transformation matrix, and a transformed image is stitched to the current-frame background image, to patch a blank untextured region in the current-frame background image; and finally, a patched background image and the current-frame posture parameter are output as a previous-frame background image and a previous-frame posture parameter, to participate in a next frame cycle, and simultaneously the patched background image is output as input data of step S05.

It should be noted that the current-frame posture parameter corresponds to the current frame, and when the current frame changes to a previous frame, the current-frame posture parameter changes to a previous-frame image posture parameter; and when a next-frame image changes to a current-frame image, a posture parameter obtained during next-frame photographing changes to a current-frame posture parameter.

Step S05: Foreground and background compositing.

A processed foreground image and a background image obtained after stitching are composited, to be output as a composited key frame video stream, where an effective region of the foreground image is retained, and an ineffective region of the foreground image is supplemented by using the background. It may be learned based on step S04 that background image stitching or patching is provided. If an angle is large enough and background image information is relatively complete, a full background image is generated, to fill all of a blank part obtained by matting a foreground region from a current image. Therefore, when the foreground is deformed, moved, or even disappears, the background image is still complete. Therefore, an ineffective region (that is, a blank untextured region) left after a foreground change can be filled by using an image having a complete background through stitching.

Step S06: Edge fusion processing.

A foreground image edge region is processed to reduce unnatural image transition caused by a sudden edge change. For example, the edge processing may be implemented through feathering processing.

Step S07: Output display.

Frame interpolation processing is performed on a video based on the key frame video stream, to implement smooth output of a processed image video. Sequence frames are generated between key frames by using a frame interpolation technology, so that video smoothness is better. A frame interpolation algorithm is not limited.

In this embodiment of this application, a user obtains more background image information in a preview stage before performing facial beautification and self-photographing, to patch an untextured seam region caused by processing such as face thinning. This can be conveniently applied to mobile terminal devices such as a mobile phone and a tablet computer, to protect background information while facial beautification is implemented.

Compared with a current technology in which stretching adjustment is performed on a background during face thinning in facial beautification, in the technology m this embodiment of this application, more comprehensive background information is better obtained by using a multi-frame learning method, thereby effectively supplementing a seam existing during foreground and background stitching. Therefore, no background distortion is caused, and a real and natural effect is achieved.

Next, the following describes, by using a camera calibration application embodiment, an implementation procedure of another application solution that is based on this embodiment of this application. When a user uses a built-in camera or an external camera connected to a notebook computer, there is a specific distance and angle between a camera location and a screen. Therefore, a face region needs to be adjusted, and there still is a problem that an adjusted foreground region that includes a face does not match a background during stitching. To patch a blank untextured region that exists during foreground and background compositing, this patent technology is also required for processing.

Figure 9:
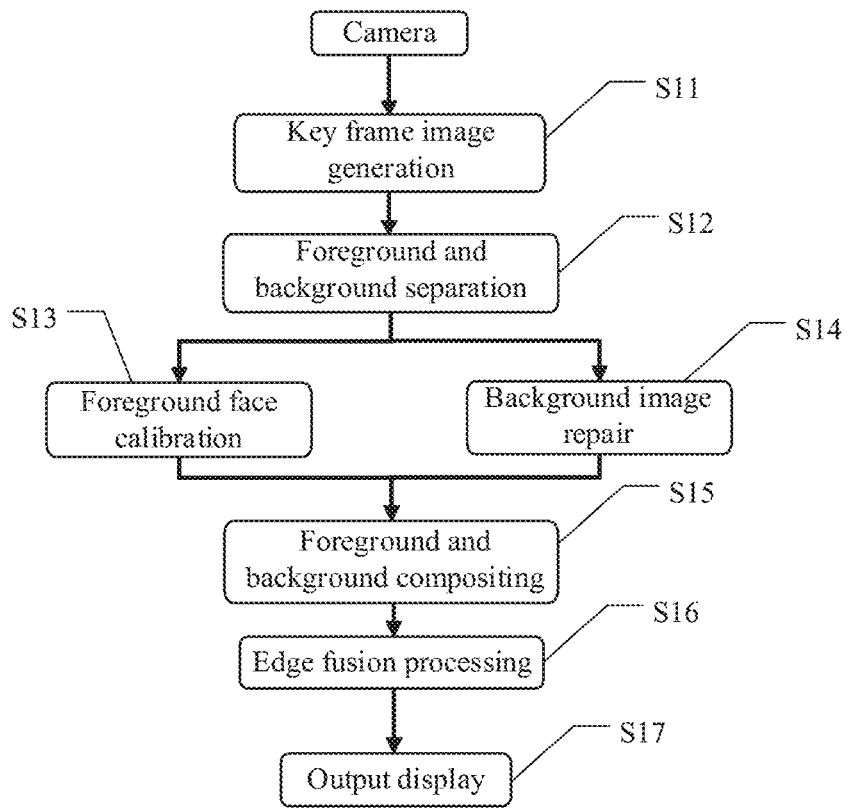
FIG. 9 is a flowchart of camera calibration according to an embodiment of this application.

FIG. 9 is a flowchart of camera calibration according to an embodiment of this application. In this embodiment of this application, a system procedure of a camera calibration application is described in steps as follows:

Step S11: Refer to step S01 in the foregoing embodiment. Details are not described herein again.

Step S12: Refer to step S02 in the foregoing embodiment. Details are not described herein again.

Step S13: Foreground face calibration.

A main foreground face calibration processing manner is as follows: Three-dimensional reconstruction is performed on a foreground region; and angle adjustment is performed on a three-dimensional face, and then a 2D image is generated through mapping.

Step S14: Background image repair. Background repair is separately performed in different cases. Examples are as follows:

One case is a scenario in which the camera is fixed and a photographing environment is unchanged. In this case, cumulative superimposition may be performed on background image regions to obtain a more comprehensive background image.

Another case is a scenario in which the camera is moved and a photographing environment is unchanged. In this case, the foregoing background image stitching processing manner in step S04 may be used. When a changed posture relationship between a previous-frame background image and a current-frame background image is estimated, if posture parameters cannot be collected, an inter-frame location change relationship between a previous frame and a current frame is directly estimated through DAISY feature matching.

A third case is a scenario in which the camera is fixed and a photographing environment is partially changed. For example, when a person is walking in a photographing background, first, person target regions are obtained from key frame backgrounds through segmentation by using an inter-frame difference method, to be saved as to-be-matched targets; and then, when it is determined, by using a target tracking algorithm, that the to-be-matched targets enter a foreground missing region of a current key frame, the to-be-matched targets are searched for a target image with relatively high contour similarity to patch the foreground missing region.

Figure 10A:
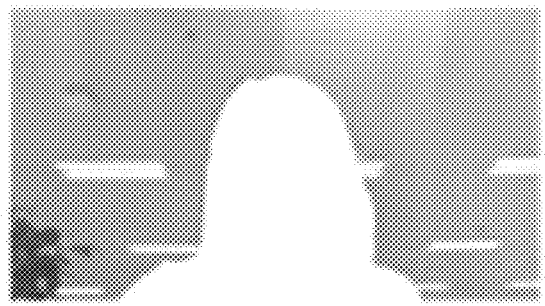
FIG. 10a is a schematic diagram of a background image of an $(n-1)^{th}$ frame according to an embodiment of this application.
Figure 10B:
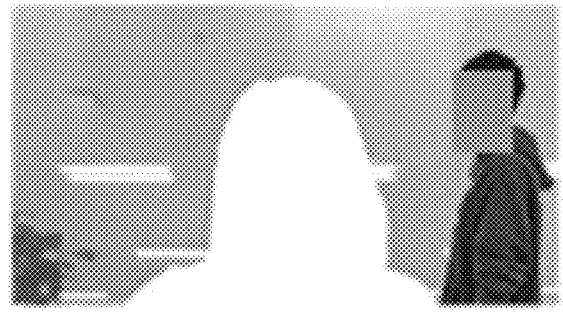
FIG. 10b is a schematic diagram of a background image of an $n^{th}$ frame according to an embodiment of this application.
Figure 10C:
FIG. 10c is a schematic diagram of a background object separated from a background image of an $n^{th}$ frame according to an embodiment of this application.
Figure 10D:
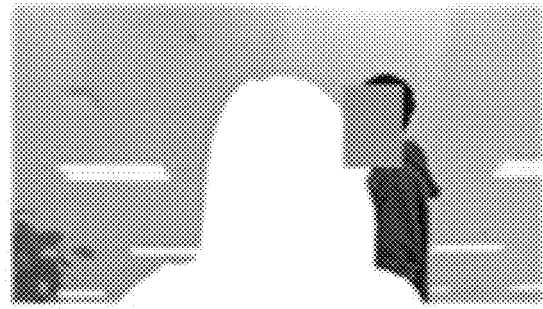
FIG. 10d is a schematic diagram of a background image of an $(n+1)^{th}$ frame according to an embodiment of this application.
Figure 10E:
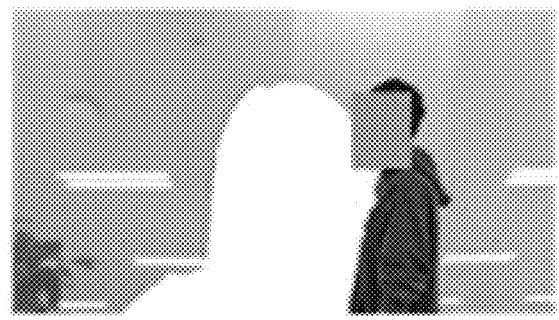
FIG. 10e is a schematic diagram of a background image that is of an $(n+1)^{th}$ frame and that is obtained after background repair according to an embodiment of this application.

FIG. 10a is a schematic diagram of a background image of an $(n-1)^{th}$ frame according to an embodiment of this application. FIG. 10b is a schematic diagram of a background image of an $n^{th}$ frame according to an embodiment of this application. It may be learned through comparison between the background image of the $n^{th}$ frame and the background image of the $(n-1)^{th}$ frame that a background object shown in FIG. 10c may be separated from the background image of the $n^{th}$ frame. FIG. 10d is a schematic diagram of a background image of an $(n+1)^{th}$ frame according to an embodiment of this application. Background repair is performed by using the background object shown in FIG. 10c and the background image of the $(n+1)^{th}$ frame. A foreground image moves when the $n^{th}$ frame moves to the $(n+1)^{th}$ frame, and consequently a foreground missing region exists in the foreground image. FIG. 10e is a schematic diagram of a background image that is of an $(n+1)^{th}$ frame and that is obtained after background repair according to an embodiment of this application. The background object shown in FIG. 10c may be composited with the background image that is of the $(n+1)^{th}$ frame and that is shown in FIG. 10d, to implement background patching when a background image is a dynamic image. Specifically, in FIG. 10b, a person is walking. The person does not enter a background in the $(n-1)^{th}$ frame shown in FIG. 10a, and enters the background in the $n^{th}$ frame. A background person image shown in FIG. 10c can be obtained by subtracting the $(n-1)^{th}$ frame image from the n$^{th}$ frame image. In FIG. 10d, the person enters a foreground image region in the (n+1)$^{th}$ frame. In this case, some regions of the walking background person are blocked by a matted foreground person (that is, a white region in FIG. 10d). To supplement the blocked background person regions, the background person regions blocked by the foreground in the background image is supplemented by using the foregoing obtained background person image, to achieve a background person patching effect when a person is walking in a background.

An execution device of step S14 may be a notebook computer. In a background processing process in step S14, a plurality of background repair implementation scenarios are added based on the background processing technology in step S04. For example, a partially changed background may be processed. This is different from the background stitching manner in step S04.

Step S15: Refer to step S05 in the foregoing embodiment. Details are not described herein again.

Step S16: Refer to step S06 in the foregoing embodiment. Details are not described herein again.

Step S17: Refer to step S07 in the foregoing embodiment. Details are not described herein again.

It may be learned from the foregoing example description that, when using a built-in camera or an external camera of a notebook computer, a user collects more background image information in a preview stage, to resolve a problem that a foreground does not match a background during compositing due to face correction or posture adjustment, to protect background information while face calibration is implemented.

It should be noted that, this embodiment of this application may be extended to another scenario in which deformation or moving processing needs to be performed after foreground segmentation and background information needs to be protected. When a background image can be obtained in advance, a scenario thereof includes but is not limited to: capturing a human body by using a camera, to implement game interaction, and when a human body image obtained after segmentation is processed and deformed, patching a blank region texture left due to the human body change, so that a game is more real; and an augmented reality technology, where a target thing (such as a sofa, a table, or a balloon) in a photographing scene is virtually moved or deformed, and an untextured region left after the thing change is patched, so that an interaction effect is more real.

Figure 11:
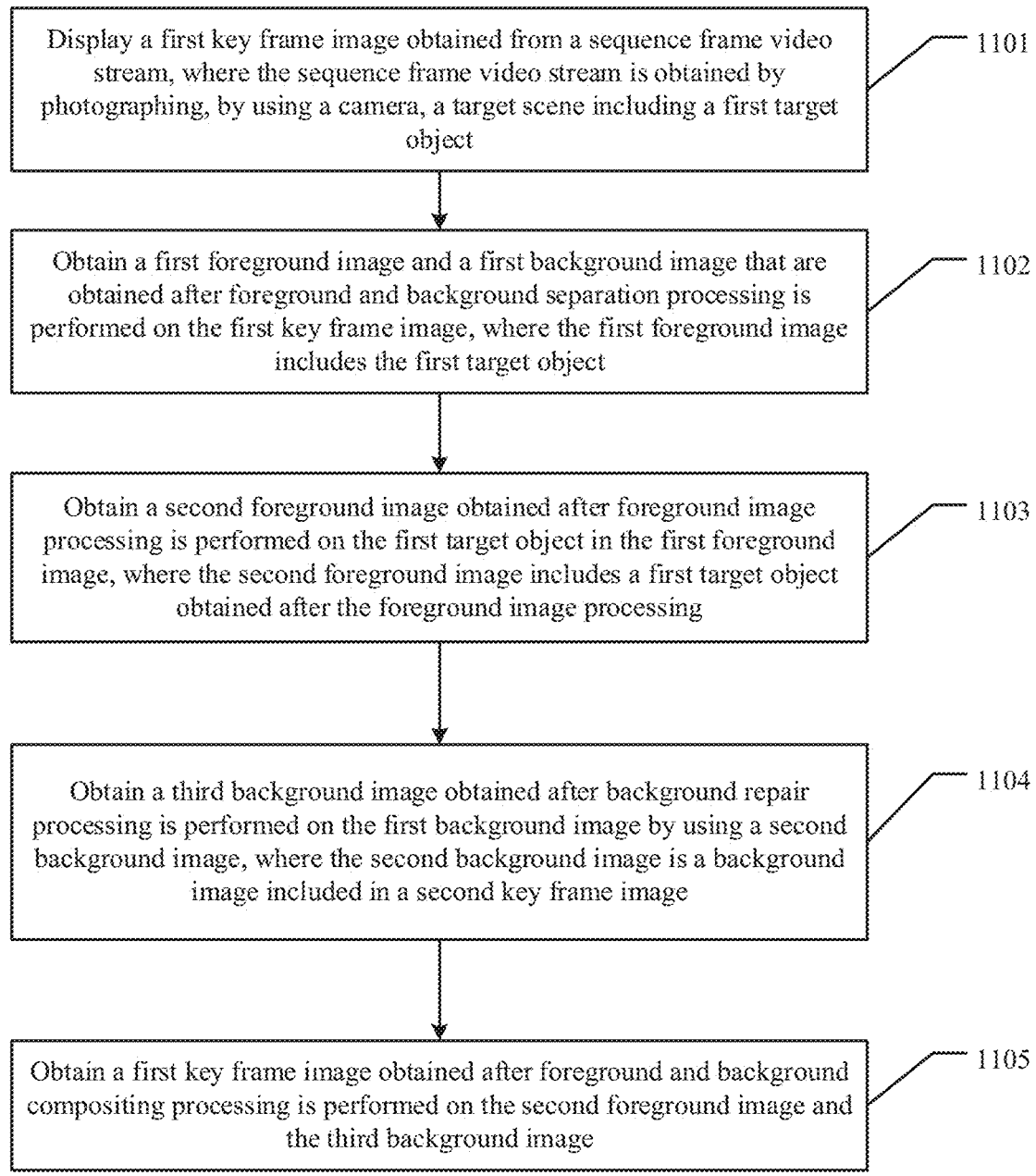
FIG. 11 is a flowchart of an image processing method according to an embodiment of this application.

With reference to the foregoing embodiments and related accompanying drawings, an embodiment of this application provides an image processing method. The method may be implemented in an electronic device (such as a mobile phone or a tablet computer) that has a camera and that is shown in FIG. 1. As shown in FIG. 11, an image processing method is applied to an electronic device having a camera. The method may include the following steps:

1101: Display a first key frame image obtained from a sequence frame video stream, where the sequence frame video stream is obtained by photographing, by using the camera, a target scene including a first target object.

For example, the camera photographs the target scene including the first target object, so that the sequence frame video stream can be generated. The sequence frame video stream is a video data stream including a plurality of sequence frame images taken by the camera. The first target object may be a portrait of a user that controls the electronic device. The target scene may be a photographing environment scene including the portrait of the user. For example, the target scene may be a photographing background, and the target scene includes a background image in addition to the portrait of the user. For example, the target scene may be a conference scene photographed when the user performs a video conference.

In an example, the first key frame image may be a key frame image in the sequence frame video stream. For example, the first key frame image may be the current key frame image in step S01 shown in FIG. 4 or step S11 shown in FIG. 9.

In some embodiments of this application, before the displaying a first key frame image obtained from a sequence frame video stream in step 1101, the method provided in this embodiment of this application further includes the following steps:

displaying a second key frame image obtained from a preview video stream, where the preview video stream is obtained by performing preview photographing on the target scene before the camera generates the sequence frame video stream; and obtaining a second background image separated from the second key frame image.

The first key frame image may be the first image extracted from the sequence frame video stream. Before the camera generates the sequence frame video stream, preview photographing is performed on the target scene to obtain the preview video stream, and the second key frame image is obtained from the preview video stream. In this case, because the camera photographs only the target scene, a background image is separated from the second key frame image, and the separated background image is used as the second background image. The second background image may be used to perform background image repair processing on a first background image. For details, refer to the descriptions in the subsequent embodiments.

For example, when photographing is performed by using the camera of the electronic device, in consideration that the user enables the camera to first perform preview, and performs angle or posture adjustment on the camera or a target based on a preview photographing effect, the user may collect a background image in advance in a preview stage, to compensate for a blank untextured region left when a foreground image is deformed after being processed subsequently.

In some other embodiments of this application, before the displaying a first key frame image obtained from a sequence frame video stream in step 1101, the method provided in this embodiment of this application further includes the following steps:

before the camera generates the sequence frame video stream, consecutively photographing the target scene by using the camera, to obtain a plurality of consecutive background images; and obtaining a second background image obtained after cumulative superimposition processing is performed on the plurality of consecutive background images.

For example, in a scenario in which the camera is fixed and a photographing environment is unchanged, the target scene is consecutively photographed by using the camera, and cumulative superimposition may be performed on the plurality of consecutive background images to obtain a more comprehensive background image. The more comprehensive background image may be used as the second background image, and the second background image may be used to perform background image repair processing on a first background image. For details, refer to the descriptions in the subsequent embodiments.

In some embodiments of this application, the displaying a first key frame image obtained from a sequence frame video stream in step 1101 includes:

displaying n sequence frame images obtained from the sequence frame video stream, where n is a positive integer greater than or equal to 2;

obtaining one original key frame image and n−1 related frame images that are determined from the n sequence frame images; and performing definition enhancement processing on the original key frame image by using pixel information of the n−1 related frame images, and determining, as the first key frame image, an original key frame image obtained after the definition enhancement processing.

In this embodiment of this application, definition enhancement may be performed on the key frame image. The original key frame image and the n−1 related frame images are determined from the n sequence frame images, the original key frame image is used as a main image, and the related frame images are n−1 frame images other than a frame image currently used as the original key frame image in the n frame images. The pixel information of the n−1 related frame images is obtained. The pixel information of the related frame image may be an energy value of each pixel of the related frame image. Definition enhancement processing is performed on the original key frame image based on the pixel information of the n−1 related frame images, and the original key frame image obtained after the definition enhancement processing is used as the first key frame image. A first key frame image with higher definition is used, so that an image compositing effect can be further improved.

Further, in some embodiments of this application, the performing definition enhancement processing on the original key frame image by using pixel information of the n−1 related frame images includes:

obtaining an original image point energy value of the original key frame image;

obtaining k front related frame images and k rear related frame images of the original key frame image from the n−1 related frame images, where a value of k is less than or equal to (n−1)÷2; and obtaining an optimized image point energy value that is of the original key frame image and that is obtained by performing optimization processing on the original image point energy value of the original key frame image by using image point energy values of the k front related frame images and the k rear related frame images of the original key frame image.

In this embodiment of this application, definition enhancement may be performed on the key frame image. The original key frame image is used as the main image, to determine the k (for example, k=1, 2, or 3) front related frame images and the k rear related frame images, and optimization processing is performed on the energy value of the original key frame image in an energy manner, to enhance resolution of the original key frame image. For details, refer to the explanations in step S01 in the foregoing embodiment.

1102: Obtain a first foreground image and the first background image that are obtained after foreground and background separation processing is performed on the first key frame image, where the first foreground image includes the first target object.

For example, after the first key frame image is obtained, foreground and background separation processing is performed on the first key frame image to obtain the first foreground image and the first background image. With reference to FIG. 2a, one complete key frame image may be segmented into one foreground image and one background image. The first foreground image obtained after the segmentation may include the first target object. With reference to FIG. 2a, the first target object may include a face and a body part of the user.

In this embodiment of this application, the foreground and background separation processing means that foreground segmentation is performed on a foreground part and a background part in a key frame image, so that a foreground image and a background image that are obtained after the segmentation are separated into two separate images. Two images may be generated through foreground and background separation processing: a foreground image and a background image.

After step 1102 is performed, in this embodiment of this application, step 1103 and step 1104 may be triggered to be performed. For example, step 1103 may be performed before step 1104, step 1104 may be performed before step 1103, or step 1103 and step 1104 may be simultaneously performed. This is not limited herein.

It should be noted that the foreground and background separation processing in step 1102 may be alternatively implemented by using a depth camera. For example, the depth camera may detect the first foreground image and the first background image from the first key frame image by using a time of flight (time of flight, TOF) algorithm.

1103: Obtain a second foreground image obtained after foreground image processing is performed on the first target object in the first foreground image, where the second foreground image includes a first target object obtained after the foreground image processing.

For example, when the first foreground image is processed, foreground image processing, for example, the foregoing foreground facial beautification processing in FIG. 4 or the foregoing foreground calibration processing in FIG. 9, may be performed on the first target object in the first foreground image. This is not limited herein. For ease of representation, a processed first foreground image may be referred to as the second foreground image, and the second foreground image is input to step 1105.

1104: Obtain a third background image obtained after background repair processing is performed on the first background image by using the second background image, where the second background image is a background image included in the second key frame image, and the second key frame image is obtained by photographing, by using the camera, the target scene before the first key frame image is obtained.

For example, the camera photographs the target scene to obtain the second key frame image. For example, the camera photographs only the target scene in a preview photographing phase, and in this case, the second key frame image can be obtained. For another example, if the second key frame image is extracted from the generated sequence frame video stream, the second key frame image includes not only the target object but also the target scene.

In an example, the second key frame image may be a key frame image in the sequence frame video stream or a key frame image in the preview video stream. For example, the second key frame image may be the previous-frame key frame image in step S04 shown in FIG. 4 or step S14 shown in FIG. 9.

In an example, background repair processing is performed on the first background image by using the second background image, and a background repair processing manner may include the foregoing background image stitching in step S04 shown in FIG. 4 or background image repair in step S14 shown in FIG. 9.

Stitching or patching is performed on the first background image by using the second background image, to extend a region area of the first background image or patch a blank untextured region left due to segmentation of the first foreground image, thereby ensuring that the second foreground image obtained after the processing can be composited with the third background image obtained after the background repair, to ensure an image compositing effect.

In some embodiments of this application, before the obtaining a third background image obtained after background repair processing is performed on the first background image by using a second background image in step 1104, the method provided in this embodiment of this application further includes:

- displaying a second key frame image obtained from the sequence frame video stream;
- obtaining a fourth background image obtained after foreground and background separation processing is performed on the second key frame image; and
- obtaining a second background image obtained by performing background repair processing on the fourth background image by using a fifth background image, where the fifth background image is separated from a third key frame image in a preview video stream, and the preview video stream is obtained by performing preview photographing on the target scene before the camera generates the sequence frame video stream.

Before the camera generates the sequence frame video stream, preview photographing is performed on the target scene to obtain the preview video stream, and the third key frame image is obtained from the preview video stream In this case, because the camera photographs only the target scene, a background image is separated from the third key frame image, the separated background image is used as the fifth background image, and the fifth background image may be used to perform background image repair processing on the fourth background image.

In this embodiment of this application, sequence frame images may be captured (for example, a total of n×m frame images are captured) in the preview phase, and one key frame image may be generated by using each n frames of sequence images. Therefore, m key frame images are generated from the n×m frame images through detection. Foreground and background separation is performed on the key frame images to obtain m foreground images and m background images. Background repair processing is performed on each of the m background images based on a front neighboring background and a rear neighboring background, to obtain as comprehensive background image information as possible. For example, background repair processing is performed on the m background images in the following manner: Stitching is performed in an image sequence. For example, first, background image repair processing is performed on a first-frame background image by using a key frame image in the preview frame video stream, and a first-frame background image is output; and then, the first-frame background image is stitched with a second-frame background image, where an image obtained after the stitching is used as a second-frame background image, and then the second-frame background image is stitched with a third-frame background image, where an image obtained after the stitching is used as a third-frame image; and so on. Two frames of images are stitched each time. Therefore, repair processing on the background image can be completed, to repair a blank untextured region that exists during foreground and background compositing after the foreground image is deformed.

In some embodiments of this application, the obtaining a third background image obtained after background repair processing is performed on the first background image by using a second background image in step 1104 includes:

- obtaining a changed inter-frame location relationship between the first background image and the second background image based on a feature point correspondence between the first background image and the second background image;
- obtaining a transformed second background image obtained after perspective transformation is performed on the second background image based on the changed inter-frame location relationship; and
- stitching the transformed second background image to the first background image to obtain the third background image.

The feature point correspondence between the first background image and the second background image is a correspondence between same feature points in the two background images. The changed inter-frame location relationship between the first background image and the second background image may be obtained based on the feature point correspondence. The changed inter-frame location relationship may be an inter-frame location relationship obtained when the second background image changes to the first background image. For example, the changed inter-frame location relationship may be a changed posture relationship between the second background image and the first background image. Next, perspective transformation is performed on the second background image based on the changed inter-frame location relationship, to obtain the transformed second background image. Finally, the transformed second background image is stitched to the first background image, so that a blank untextured region in the current-frame background image can be patched. After the second background image obtained after the perspective transformation is stitched to the first background image, the third background image can be output. The third background image may be used for the foreground and background image compositing. Because the blank untextured region has been patched in the third background image, an image compositing effect can be improved.

In another example, the obtaining a changed inter-frame location relationship between the first background image and the second background image based on a feature point correspondence between the first background image and the second background image includes:

- obtaining a current-frame posture parameter corresponding to the first background image;
- obtaining an initial inter-frame location relationship between the first background image and the second background image based on a previous-frame posture parameter corresponding to the second background image and the current-frame posture parameter;
- obtaining the feature point correspondence obtained after feature extraction and feature matching are performed on the first background image and the second background image; and
- optimizing the initial inter-frame location relationship by using the feature point correspondence, to obtain the changed inter-frame location relationship between the first background image and the second background image.

The current-frame posture parameter corresponding to the first background image may be obtained by using an IMU of the electronic device, the previous-frame posture parameter corresponding to the second background image may be obtained by using a prestored posture parameter, and the initial inter-frame location relationship between the first background image and the second background image is calculated by using the previous-frame posture parameter and the current-frame posture parameter. Next, feature extraction and feature matching are performed on the first background image and the second background image to obtain the feature point correspondence. An extracted feature may be a DAISY feature. Finally, the initial inter-frame location relationship is optimized by using the feature point correspondence, to obtain the changed inter-frame location relationship between the first background image and the second background image. For example, as shown in FIG. 8, first, the initial inter-frame location relationship between a current frame and a previous frame is obtained through calculation based on the posture parameter obtained during current photographing by using the IMU and the previous-frame posture parameter; and then DAISY feature extraction and matching are performed on the output current-frame background image and the previous-frame background image, and the initial inter-frame location relationship between the current frame and the previous frame is optimized by using the feature point correspondence, to obtain the changed inter-frame location relationship.

It should be noted that the current-frame posture parameter corresponds to the current frame, and when the current frame changes to a previous frame, the current-frame posture parameter changes to a previous-frame image posture parameter; and when a next-frame image changes to a current-frame image, a posture parameter obtained during next-frame photographing changes to a current-frame posture parameter.

In another example, the obtaining a transformed second background image obtained after perspective transformation is performed on the second background image based on the changed inter-frame location relationship includes:
  obtaining a perspective transformation matrix between the first background image and the second background image by using the changed inter-frame location relationship; and
  obtaining the transformed second background image obtained after perspective transformation is performed on the second background image by using the perspective transformation matrix.

The perspective transformation matrix between the current-frame image and the previous-frame image is calculated by using the changed inter-frame location relationship obtained after the optimization, perspective transformation is performed on the previous-frame background image by using the perspective transformation matrix, and the transformed image is stitched to the current-frame background image, to patch a blank untextured region in the current-frame background image. Finally, a patched background image and the current-frame posture parameter are output as a previous-frame background image and a previous-frame posture parameter, to participate in a next frame cycle, and simultaneously the patched background image is output.

In another example, the obtaining a third background image obtained after background repair processing is performed on the first background image by using a second background image includes:
  obtaining a background object image from the second background image through segmentation; and
  when the background object image enters a foreground missing region in the first background image, performing background patching processing on the first background image by using the background object image.

In a scenario in which the camera is fixed and a photographing environment is partially changed, for example, when a person is walking in a photographing background, first, person target regions are obtained from key frame backgrounds through segmentation by using an inter-frame difference method, to be saved as to-be-matched targets; and then, when it is determined, by using a target tracking algorithm, that the to-be-matched targets enter a foreground missing region of a current key frame, the to-be-matched targets are searched for a target image with relatively high contour similarity to patch the foreground missing region.

As shown in FIG. 10*a* to FIG. 10*e*, a person is walking, and the person does not enter a background in an $(n-1)^{th}$ frame, and enters the background in an $n^{th}$ frame. A background person image can be obtained by subtracting the $(n-1)^{th}$ frame image from the $n^{th}$ frame image. The person enters a foreground image region in an $(n+1)^{th}$ frame. In this case, some regions of the walking background person are blocked by a matted foreground person (that is, a white region). To supplement the blocked background person regions, the background person regions blocked by the foreground in the background image is supplemented by using the foregoing obtained background person image, to achieve a background person patching effect when a person is walking in a background.

1105: Obtain a first key frame image obtained after foreground and background compositing processing is performed on the second foreground image and the third background image.

For example, the foreground and background compositing processing performed on the second foreground image and the third background image may include the foreground and background compositing in step S05 shown in FIG. 4 or step S15 shown in FIG. 9.

Figure 12:
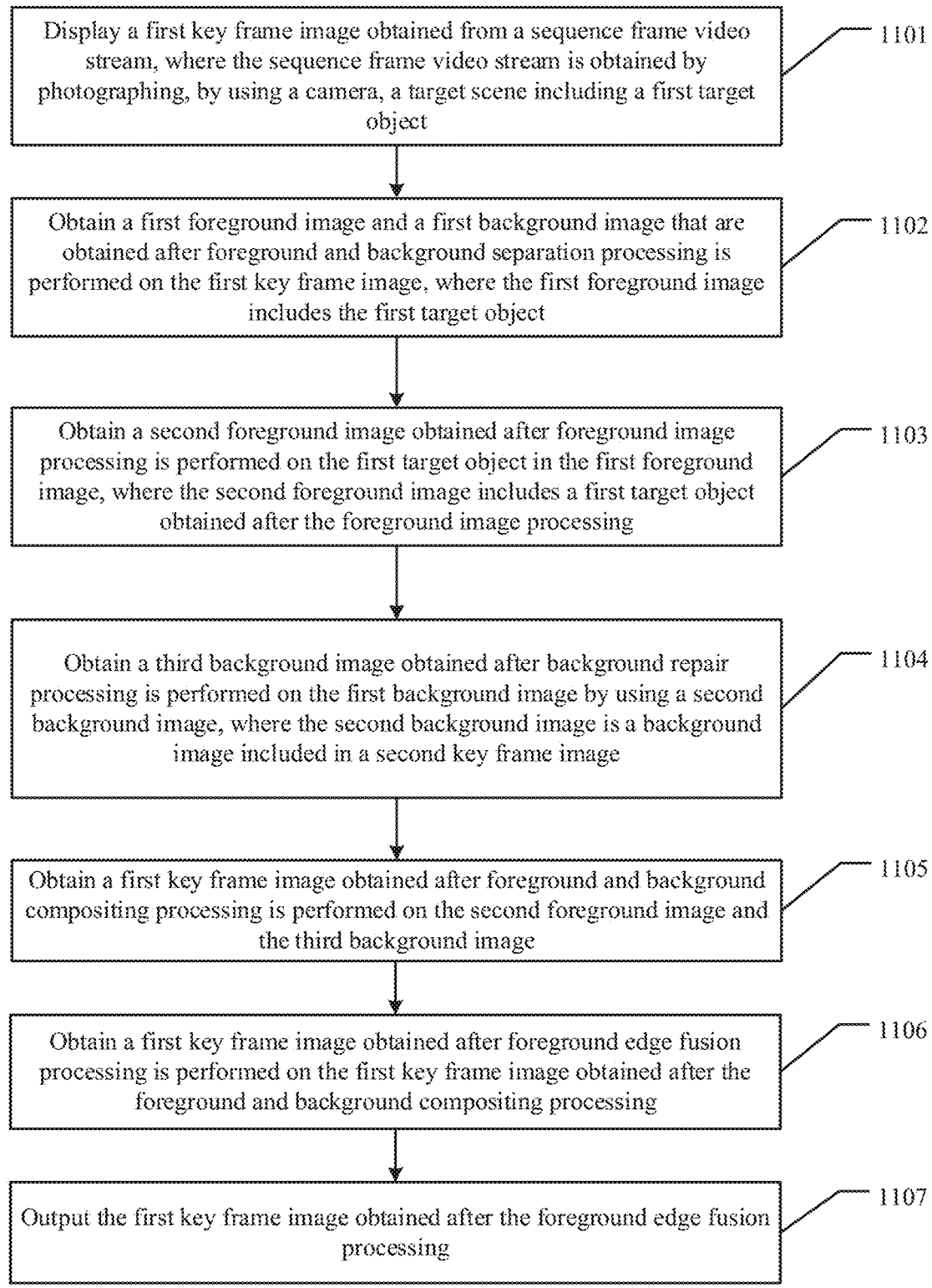
FIG. 12 is a flowchart of an image processing method according to an embodiment of this application.

In another embodiment, referring to FIG. 12, after the obtaining a first key frame image obtained after foreground and background compositing processing is performed on the second foreground image and the third background image in step 1105, the image processing method provided in this embodiment of this application further includes:

1106: Obtain a first key frame image obtained after foreground edge fusion processing is performed on the first key frame image obtained after the foreground and background compositing processing.

1107: Output the first key frame image obtained after the foreground edge fusion processing.

A foreground image edge region is processed to reduce unnatural image transition caused by a sudden edge change. For example, the edge processing may be implemented through feathering processing. Frame interpolation processing is performed on a video based on a key frame video stream, to implement smooth output of a processed image video. Sequence frames are generated between key frames by using a frame interpolation technology, so that video smoothness is better. A frame interpolation algorithm is not limited.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software.

Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In the embodiments, function modules of the electronic device may be obtained through division according to the foregoing method examples. For example, the function modules may be obtained through division corresponding to various functions, or two or more functions may be integrated into one processing module. The integrated module may be implemented in a form of hardware. It should be noted that, in the embodiments, division into modules is an example, and is merely logical function division. In actual implementation, another division manner may be used.

Figure 13:
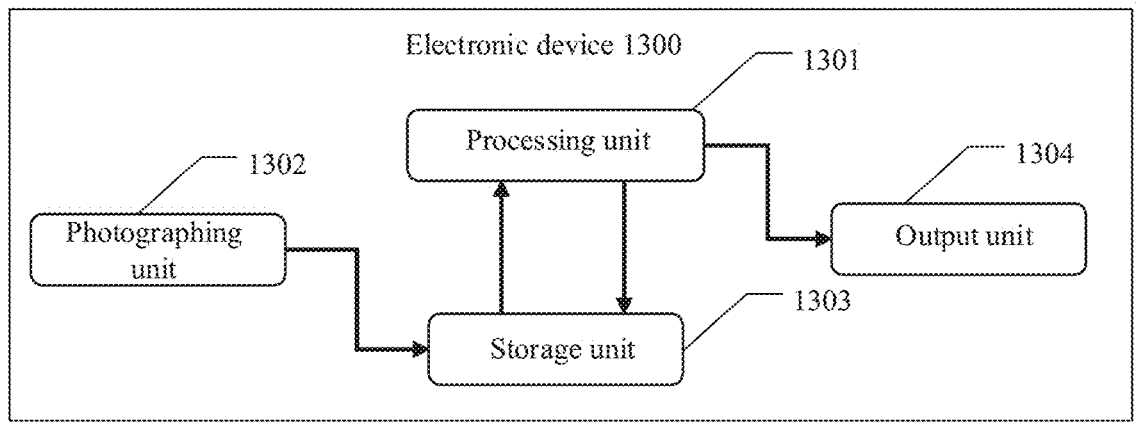
FIG. 13 is a schematic diagram of a composition structure of an electronic device according to an embodiment of this application.
Figure 14:
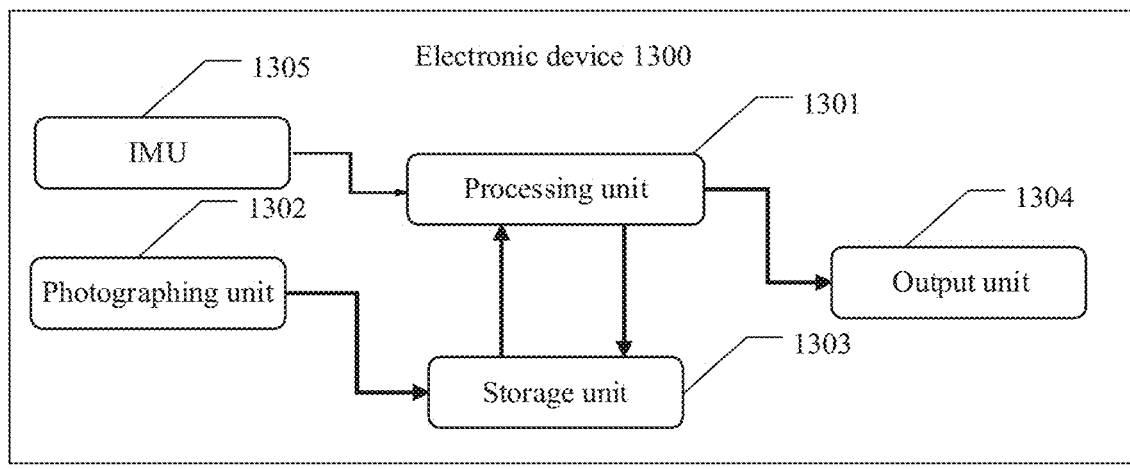
FIG. 14 is a schematic diagram of a composition structure of an electronic device according to an embodiment of this application.

When function modules are obtained through division based on corresponding functions, FIG. 13 is a schematic diagram of possible composition of an electronic device 1300 according to the foregoing embodiment. As shown in FIG. 13, the electronic device 1300 may include a processing unit 1301, a photographing unit 1302, a storage unit 1303, and an output unit 1304. As shown in FIG. 14, the electronic device 1300 may include an IMU 1305.

The processing unit 1301 may be configured to support the electronic device 1300 in performing step 1101 to step 1105, step 1106, and the like, and/or another process used for a technology described in this specification. The processing unit is a physical unit configured to calculate a key frame image by using a sequence frame, perform segmentation on a foreground region and a background region of the key frame image, and separately process the foreground region and the background region.

The photographing unit 1302 may be configured to support the electronic device 1300 in photographing a target object, performing preview photographing on the target scene, and/or performing another process used for a technology described in this specification. The photographing unit is a physical unit configured to take a target image, such as a lens, an image sensor, an image signal processor (image signal processor, ISP), or the like.

The storage unit 1303 may be configured to support the electronic device 1300 in storing data or the like generated in step 1101 to step 1107, and/or performing another process used for a technology described in this specification. The storage unit is a physical unit configured to store information such as a sequence frame image that is output by a camera, and a foreground image and a background image that are obtained by the processing unit through segmentation.

The output unit 1304 is a physical unit that outputs information such as a foreground and background region compositing result to a user.

The IMU 1305 is configured to: collect a posture parameter corresponding to the camera during image taking, and send the posture parameter to the processing unit 1301.

It should be noted that all related content of the steps in the foregoing method embodiments may be cited in function descriptions of corresponding function modules. Details are not described herein.

The electronic device provided in this embodiment is configured to perform the foregoing image processing method, and therefore can achieve the same effect as that of the foregoing implementation methods.

When an integrated unit is used, the electronic device may include a processing module, a storage module, and a communications module.

The processing module may be configured to control and manage actions of the electronic device, for example, may be configured to support the electronic device in performing the steps performed by the processing unit 1301 and the photographing unit 1302. The storage module may be configured to: support the electronic device in performing the steps performed by the storage unit 1303, and store program code, data, and the like. The communications module may be configured to support communication between the electronic device and another device.

The processing module may be a processor or a controller. The processor may implement or execute various examples of logical blocks, modules, and circuits described with reference to the content disclosed in this application. Alternatively, the processor may be a combination of processors implementing a computing function, for example, a combination including one or more microprocessors, or a combination of a digital signal processor (digital signal processing, DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in the embodiments may be a device in the structure shown in FIG. 1.

This embodiment further provides a computer storage medium. The computer storage medium stores computer instructions. When the computer instructions are run on an electronic device, the electronic device is enabled to perform the related method steps, to implement the image processing method in the foregoing embodiments.

This embodiment further provides a computer program product. When the computer program product runs on a computer, the computer is enabled to perform the foregoing related steps, to implement the image processing method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the image processing method in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above. Details are not described herein again.

The foregoing descriptions about implementations allow a person skilled in the art to understand that, for convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division. There may be another division manner in actual implementation. For example, a plurality of units or components may be combined or integrated into another apparatus, or some features may be ignored or not performed.

In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and parts displayed as units may be one or more physical units, may be located in one place, or may be distributed on different places. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a read-only memory (read only memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   photographing, using a camera of an electronic device, a target scene to obtain a second key frame image, wherein the second key frame image comprises a second background image;
   photographing, using the camera, the target scene comprising a first target object to obtain a sequence frame video stream;
   displaying a first key frame image of the sequence frame video stream by:
   displaying n sequence frame images of the sequence frame video stream, wherein n is a positive integer greater than or equal to 2;
   obtaining a first original key frame image and n−1 related frame images from the n sequence frame images;
   obtaining an original image point energy value of the first original key frame image;
   obtaining k front related frame images and k rear related frame images of the first original key frame image from the n−1 related frame images, wherein a value of k is less than or equal to (n−1)÷2; and
   performing optimization processing on the original image point energy value using image point energy values of the k front related frame images and the k rear related frame images to obtain an optimized image point energy value of the first original key frame image;
   performing foreground and background separation processing on the first key frame image to obtain a first foreground image and a first background image, wherein the first foreground image comprises the first target object;
   performing foreground image processing on the first target object to obtain a second foreground image, wherein the second foreground image comprises the first target object;
   performing, using the second background image, background repair processing on the first background image to obtain a third background image; and
   performing foreground and background compositing processing on the second foreground image and the third background image to obtain a third key frame image.

2. The method of claim 1, wherein before displaying the first key frame image, the method further comprises:
   performing, before obtaining the sequence frame video stream, preview photographing on the target scene to obtain a preview video stream;
   displaying the second key frame image from the preview video stream; and
   obtaining the second background image separated from the second key frame image.

3. The method of claim 1, wherein before obtaining the third background image, the image processing method further comprises:
   displaying the second key frame image;
   performing the foreground and background separation processing on the second key frame image to obtain a fourth background image;
   performing preview photographing on the target scene before obtaining the sequence frame video stream to obtain a preview video stream, wherein the preview video stream comprises a fourth key frame image;
   separating a fifth background image from the fourth key frame image; and
   performing the background repair processing on the fourth background image using the fifth background image to obtain the second background image.

4. The method of claim 1, wherein before displaying the first key frame image, the method further comprises:
   consecutively photographing, using the camera, the target scene to obtain a plurality of consecutive background images before obtaining the sequence frame video stream; and
   performing cumulative superimposition processing on the consecutive background images to obtain the second background image.

5. The method of claim 1, further comprising:
performing definition enhancement processing on the first original key frame image using pixel information of the n−1 related frame images to obtain a second original key frame image; and
setting, as the first key frame image, the second original key frame image.

6. The method of claim 1, wherein after obtaining the third key frame image, the method further comprises:
performing foreground edge fusion processing on the third key frame image to obtain a fourth key frame image; and
outputting the fourth key frame image.

7. The method of claim 1, further comprising:
obtaining a changed inter-frame location relationship between the first background image and the second background image based on a feature point correspondence between the first background image and the second background image;
performing perspective transformation on the second background image based on the changed inter-frame location relationship to obtain a transformed second background image; and
stitching the transformed second background image to the first background image to obtain the third background image.

8. The method of claim 7, further comprising:
obtaining a current-frame posture parameter corresponding to the first background image;
obtaining an initial inter-frame location relationship between the first background image and the second background image based on a previous-frame posture parameter corresponding to the second background image and the current-frame posture parameter;
performing feature extraction and feature matching on the first background image and the second background image to obtain the feature point correspondence; and
optimizing the initial inter-frame location relationship using the feature point correspondence to obtain the changed inter-frame location relationship.

9. The method of claim 8, further comprising:
obtaining a perspective transformation matrix between the first background image and the second background image using the changed inter-frame location relationship; and
further performing the perspective transformation on the second background image using the perspective transformation matrix to obtain the transformed second background image.

10. The method of claim 1, further comprising:
obtaining a background object image from the second background image through segmentation;
identifying that the background object image has entered a foreground missing region in the first background image; and
performing, in response to the identifying, background patching processing on the first background image using the background object image.

11. An electronic device comprising:
a camera;
a memory configured to store instructions; and
a processor coupled to the memory and the camera, wherein when executed by the processor, the instructions cause the electronic device to:
photograph, using the camera, a target scene to obtain a second key frame image, wherein the second key frame image comprises a second background image;
photograph, using the camera, the target scene comprising a first target object to obtain a sequence frame video stream;
display a first key frame image of the sequence frame video stream, wherein to display the first key frame image, when executed by the processor, the instructions further cause the electronic device to:
display n sequence frame images of the sequence frame video stream, wherein n is a positive integer greater than or equal to 2;
obtain a first original key frame image and n−1 related frame images from the n sequence frame images;
obtain an original image point energy value of the first original key frame image;
obtain k front related frame images and k rear related frame images of the first original key frame image from the n−1 related frame images, wherein a value of k is less than or equal to (n−1)÷2; and
perform optimization processing on the original image point energy value using image point energy values of the k front related frame images and the k rear related frame images to obtain an optimized image point energy value of the first original key frame image;
perform foreground and background separation processing on the first key frame image to obtain a first foreground image and a first background image, wherein the first foreground image comprises the first target object;
perform foreground image processing on the first target object in the first foreground image to obtain a second foreground image, wherein the second foreground image comprises the first target object;
perform, using the second background image, background repair processing on the first background image to obtain a third background image; and
perform foreground and background compositing processing on the second foreground image and the third background image to obtain a third key frame image.

12. The electronic device of claim 11, wherein before displaying the first key frame image and when executed by the processor, the instructions further cause the electronic device to:
perform, before obtaining the sequence frame video stream, preview photographing on the target scene to obtain a preview video stream;
display the second key frame image from the preview video stream; and
obtain the second background image separated from the second key frame image.

13. The electronic device of claim 11, wherein before obtaining the third background image and when executed by the processor, the instructions further cause the electronic device to:
display the second key frame image;
perform the foreground and background separation processing on the second key frame image to obtain a fourth background image;
perform preview photographing on the target scene before obtaining the sequence frame video stream to obtain a preview video stream, wherein the preview video stream comprises a fourth key frame image;
separate a fifth background image from the fourth key frame image; and perform the background repair processing on the fourth background image using the fifth background image to obtain the second background image.

14. The electronic device of claim 11, wherein before displaying the first key frame image and when executed by the processor, the instructions further cause the electronic device to:
consecutively photograph, using the camera, the target scene to obtain a plurality of consecutive background images before obtaining the sequence frame video stream; and
perform cumulative superimposition processing on the consecutive background images to obtain the second background image.

15. The electronic device of claim 11, wherein when executed by the processor, the instructions further cause the electronic device to:
perform definition enhancement processing on the first original key frame image using pixel information of the n−1 related frame images to obtain a second original key frame image; and
set, as the first key frame image, the second original key frame image.

16. The electronic device of claim 11, wherein when executed by the processor, the instructions further cause the electronic device to:
perform foreground edge fusion processing on the third key frame image to obtain a fourth key frame image; and
output the fourth key frame image.

17. The electronic device of claim 11, wherein when executed by the processor, the instructions further cause the electronic device to:
obtain a changed inter-frame location relationship between the first background image and the second background image based on a feature point correspondence between the first background image and the second background image;
perform perspective transformation on the second background image based on the changed inter-frame location relationship to obtain a transformed second background image; and
stitch the transformed second background image to the first background image to obtain the third background image.

18. The electronic device of claim 17, wherein when executed by the processor, the instructions further cause the electronic device to:
obtain a current-frame posture parameter corresponding to the first background image;
obtain an initial inter-frame location relationship between the first background image and the second background image based on a previous-frame posture parameter corresponding to the second background image and the current-frame posture parameter;
perform feature extraction and feature matching on the first background image and the second background image to obtain the feature point correspondence; and
optimize the initial inter-frame location relationship using the feature point correspondence to obtain the changed inter-frame location relationship.

19. A computer program product comprising computer-executable instructions that are stored on a non-transitory computer-readable storage medium and that, when executed by one or more processors, cause an electronic device to: photograph, using a camera, a target scene to obtain a second key frame image, wherein the second key frame image comprises a second background image; photograph, using the camera, the target scene comprising a first target object to obtain a sequence frame video stream; display a first key frame image of the sequence frame video stream, wherein to display the first key frame image, the instructions when executed by the one or more processors, further cause the electronic device to: display n sequence frame images of the sequence frame video stream, wherein n is a positive integer greater than or equal to 2; obtain a first original key frame image and n−1 related frame images from the n sequence frame images; obtain an original image point energy value of the first original key frame image; obtain k front related frame images and k rear related frame images of the first original key frame image from the n−1 related frame images, wherein a value of k is less than or equal to (n−1)÷2; and perform optimization processing on the original image point energy value using image point energy values of the k front related frame images and the k rear related frame images to obtain an optimized image point energy value of the first original key frame image; perform foreground and background separation processing on the first key frame image to obtain a first foreground image and a first background image, wherein the first foreground image comprises the first target object; perform foreground image processing on the first target object in the first foreground image to obtain a second foreground image, wherein the second foreground image comprises the first target object; perform, using the second background image, background repair processing on the first background image to obtain a third background image; and perform foreground and background compositing processing on the second foreground image and the third background image to obtain a third key frame image.

20. The computer program product of claim 19, wherein the instructions when executed by the one or more processors, further cause the electronic device to:
perform, before obtaining the sequence frame video stream, preview photographing on the target scene to obtain a preview video stream;
display the second key frame image from the preview video stream; and
obtain the second background image separated from the second key frame image.

* * * * *

UNITED STATES PATENT AND TRADEMARK OFFICE
CERTIFICATE OF CORRECTION

PATENT NO. : 12,175,681 B2
APPLICATION NO. : 17/636542
DATED : December 24, 2024
INVENTOR(S) : Liqiang Wang and Henghui Lu Page 1 of 1

It is certified that error appears in the above-identified patent and that said Letters Patent is hereby corrected as shown below:

In the Claims

Claim 9, Column 37, Line 41: "claim 8" should read "claim 7"

Signed and Sealed this
Eighteenth Day of February, 2025

Coke Morgan Stewart
*Acting Director of the United States Patent and Trademark Office*